(12) United States Patent
Hirai et al.

(10) Patent No.: US 8,029,898 B2
(45) Date of Patent: Oct. 4, 2011

(54) INORGANIC COMPOUND PARTICLE

(75) Inventors: Toshiharu Hirai, Kitakyushu (JP);
Hiroyasu Nishida, Kitakyushi (JP);
Michio Komatsu, Kitakyushi (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 0 days.

(21) Appl. No.: 12/426,346

(22) Filed: Apr. 20, 2009

(65) Prior Publication Data

US 2009/0202834 A1    Aug. 13, 2009

Related U.S. Application Data

(63) Continuation of application No. 10/898,894, filed on Jul. 26, 2004, now Pat. No. 7,575,803, which is a continuation of application No. 10/275,834, filed as application No. PCT/JP01/05255 on Jun. 20, 2001, now Pat. No. 6,777,069.

(30) Foreign Application Priority Data

Jun. 20, 2000  (JP) ................................. 2000-185271

(51) Int. Cl.
*B32B 5/66* (2006.01)
(52) U.S. Cl. ........ 428/403; 428/404; 428/405; 428/406; 428/407
(58) Field of Classification Search .......... 428/403–407; 427/212
See application file for complete search history.

(56) References Cited

U.S. PATENT DOCUMENTS

| | | | |
|---|---|---|---|
| 5,258,212 A | 11/1993 | Tomaru et al. | |
| 5,965,975 A | 10/1999 | Chigusa et al. | |
| 6,040,053 A | 3/2000 | Scholz et al. | |
| 6,132,773 A * | 10/2000 | Amiche | 424/490 |
| 6,136,228 A | 10/2000 | Hirai et al. | |
| 6,180,030 B1 | 1/2001 | Hirai et al. | |
| 6,184,125 B1 | 2/2001 | Chigusa et al. | |
| 6,261,214 B1 | 7/2001 | Meguriya | |
| 6,274,648 B1 | 8/2001 | Meguriya et al. | |
| 6,552,096 B2 | 4/2003 | Meguriya | |
| 6,777,069 B2 * | 8/2004 | Ito et al. | 428/322.2 |
| 7,575,803 B2 * | 8/2009 | Hirai et al. | 428/402 |
| 2003/0130363 A1 | 7/2003 | Meguriya | |

FOREIGN PATENT DOCUMENTS

| | | |
|---|---|---|
| JP | 6151101 A | 3/1986 |
| JP | 07133105 A | 5/1995 |
| JP | 10040834 A | 2/1998 |

OTHER PUBLICATIONS

JP 03100059A, Sep. 1989, English Abstract.
JP 01238963A, Apr. 1991, English Abstract.
JP 2002-079616A, Mar. 2002, English Abstract.
Database XP-002180783 Derwent Publications Ltd., Catalysts & Chem. Ind. Co. Ltd., Dec. 21, 1998.
CN 1216567, English Abstract, Inventor: F. Amiche, entitled "Method for Preparing Particles Comprisnig a Core and a Silica Shell", publication date: May 12, 1999.

* cited by examiner

Primary Examiner — Leszek Kiliman
(74) Attorney, Agent, or Firm — The Webb Law Firm

(57) ABSTRACT

Inorganic compound particles constituted of a shell, a porous matter or a cavity enclosed therein, and the porous matter or the cavity being kept unchanged in a subsequently formed transparent coating film.

7 Claims, 3 Drawing Sheets

100nm

100nm

INORGANIC COMPOUND PARTICLE

CROSS-REFERENCE TO RELATED APPLICATIONS

This application is a continuation of co-pending U.S. patent application Ser. No. 10/898,894 filed Jul. 26, 2004, entitled "Inorganic Compound Particle and Process for Preparation Thereof", now U.S. Pat. No. 7,575,803, which is a continuation of U.S. patent application Ser. No. 10/275,834, filed Nov. 8, 2002, now U.S. Pat. No. 6,777,069 issued Aug. 17, 2004, entitled "Transparent Film-Coated Substrate, Coating Liquid For Transparent Film Formation, and Display Device", which is the national phase of PCT/JP01/05255, filed Jun. 20, 2001, corresponding to Japanese Application No. 2000-185271 filed Jun. 20, 2000.

BACKGROUND OF THE INVENTION

1. Field of the Invention

The present invention relates to a substrate coated with a transparent film, a coating liquid for forming the transparent film, and a display device employing the substrate coated with the transparent film. More specifically, the present invention relates to a substrate coated with a transparent film, which has high strength, and is excellent in antireflection property, anti-static property, electromagnetic wave-shielding property, durability, water-resistance, chemical resistance, and in particular excellent in scratch resistance. The present invention relates also to a coating liquid suitable for the transparent film formation, and a display device having a front face plate constructed of the substrate coated with the transparent film.

2. Description of the Prior Art

For prevention of reflection at the surface of a substrate such as a glass plate, and a plastic sheet, an antireflection film is formed thereon. For example, a film of a low-reflectance material such as magnesium fluoride is formed on the glass or plastic sheet by vapor deposition, CVD, or a like method. However, such methods are costly.

In another method of formation of antireflection film, a coating liquid containing fine silica particles is applied on a glass surface to form a film with uniform surface roughness originated from fine silica particles. This method intends to prevent reflection of light by reducing normal reflection by making the reflection irregular on the irregular surface formed by fine silica particles, or this method intends to prevent reflection of light by an air layer in interspace between the fine particles. However, with this method, it is not easy to fix the particles onto the substrate surface or to form a single layer film thereof on the surface of the substrate and to control the surface reflectance.

For further improvement, the applicant of the present invention discloses use of a transparent coating film constituted of a composite oxide particles in which porous core particle coated with silica and a matrix. This transparent film has a low reflectance, and useful as a surface coat constituent for low reflectance of a substrate such as low reflectance glass and a low reflectance sheet or film (Japanese Patent Publication No. 7-133105).

Furthermore, in JPA 10-40834, it is described that the cathode ray tube has a layer containing mainly $SiO_2$ as well as silicon materials and/or $ZrO_2$ provided on a conductive layer containing conductive particles such as silver. It is also described that a coating layer containing mainly $SiO_2$ as well as alkoxysilane containing the fluoroalkyl group is formed on the conductive particulate layer and the upper and lower coating layers are fired at the same time, in JPA 10-40834. By using alkoxysilane containing fluoroalkyl groups, the water tightness and chemical resistance of the film are enhanced to provide a cathode ray tube with a reflection preventing film which are effective in preventing AEF (alternating electric field) with high brightness and low surface resistance in JPA 10-40834.

The aforementioned transparent films, however, are not sufficient in scratch resistance, being liable to be scratched at the surface to become inferior in the transparency or the antireflection property of substrate.

The transparent substrate for the display panel of a cathode ray tube, a fluorescent display tube, or a liquid crystal display is conventionally coated with an anti-static film for prevention of electrification of the transparent substrate surface. The surface of this anti-static coating film may further be coated with the transparent film.

As the anti-static coating film, for example, the film having a surface resistance of about $10^2$ to $10^{10}$ $\Omega/\square$ is known.

As an aside, it is known that the display devices like a cathode ray tube emit an electromagnetic wave. Therefore, it is known that an electroconductive film having a low surface resistance of about $10^2$ to $10^4$ $\Omega/\square$ is formed on the surface of the display panel of the cathode ray display tube or the like for shielding the electromagnetic wave and the electromagnetic field generated by the emission thereof in addition to the aforementioned anti-static function.

An example of the above-mentioned anti-static coating film is an electroconductive coating film formed by application of an electroconductive film-forming liquid containing the fine particles of electroconductive metal oxide such as ITO on the surface of the substrate. Another example of the electroconductive coating film of a low surface resistance for electromagnetic wave shielding is a coating film containing fine metal particulate formed on the surface of the substrate by application of an electroconductive film-forming liquid containing fine particles of electroconductive metal like Ag.

However, in the aforementioned electroconductive coating films formed on substrate, the fine metal particles contained therein can be oxidized, can grow to larger particles by metal ionization, or can be corroded. Thereby, the electroconductivity or light transmittance of the coating film may be decreased, which lowers the reliability of the display apparatus. Further, the electroconductive oxide particles and fine metal particles contained in the electroconductive coating film have high refractivity, which causes reflection of light, disadvantageously.

The disadvantages can be overcome by additional formation of a transparent coating film having a lower refractivity on the electroconductive film to prevent the reflection and to protect the electroconductive film.

The conventional transparent film which is coated with an electroconductive coating film containing the fine particles of an electroconductive metal oxide such as ITO has a low reflectivity of about 1% in the center wavelength portion around 500 nm to 600 nm (bottom reflectivity) of the visible light (wavelength region: 400 nm to 700 nm). However, the reflectivity is higher at the wavelength regions near 400 nm and near 700 nm. Therefore, the luminous reflection (average reflectivity over the entire visible light region) should be decreased as well as the bottom reflectivity (average reflectivity around the wavelength from 500 to 600 nm).

On the other hand, when a conventional transparent coating film containing a matrix composed of silica or the like is formed on the electroconductive film surface, the density of the electroconductive film is liable to become nonuniform owing to the difference in the shrinkage degree between the transparent film and the electroconductive film. As a consequence, failure of electrical contact between the electroconductive fine particles may result and insufficient overall electroconductivity of the film may develop.

Furthermore, in the heat treatment, the transparent coating film is not sufficiently densified and is porous so as to form cracks and voids, which may permit penetration of moisture and chemicals such as acids and alkalis, all of which are disadvantages.

An acid or alkali which penetrates into the transparent coating film may react with the surface of the substrate to lower the refractivity, or may react with the fine particles of the metal or the like in the formed electroconductive coating film, when it is employed, to lower the chemical resistance of the coating film and to decrease the anti-static property and electromagnetic wave shielding effect of the electroconductive film, disadvantageously.

In the case where the transparent film is formed on the surface of the electroconductive film containing the fine metal particles, although the bottom reflectivity is as low as 0.2%, the reflectivities near 400 nm and near 700 nm are high, and the luminous reflectivity is in the range of about 0.5 to 1%. This makes the visual feeling of the image reflection (mirror reflection) stronger, and the coloration of the reflected light cannot readily be suppressed. Therefore, the transparent film should further be improved in the anti-reflection property.

The inventors of the present invention, after comprehensive investigation on the low reflectivity film to be formed on the electroconductive coating film, found a transparent film comprising a matrix containing a silicone having a fluorine-substituted alkyl group, and an inorganic compound particles constituted of a shell and a porous matter or cavity enclosed therein. This transparent coating film has a sufficiently low refractive index, a low shrinkage property, and hydrorphobicity, and adheres well to the substrate and the transparent electroconductive layer, having high film strength and high scratch resistance. The substrate coated with such a transparent film is excellent in durability, water resistance, chemical resistance, and anti-reflection. The transparent film formed on the electroconductive film surface gives excellent anti-static property and excellent luminous reflection factor, preventing the mirror reflection, and the coloration of the reflection. Thereby, a display device can be made which has excellent display performance. Thus the present invention has been achieved.

SUMMARY OF THE INVENTION

The present invention intends to provide a substrate coated with a transparent coating film, containing specified inorganic compound particles and a specified fluorine-containing silicone, which has low reflectivity, low shrinkage property, and high hydrophobicity, and which is excellent in adhesiveness to the substrate or the transparent electroconductive layer (transparent electroconductive coating film) when the layer is formed, film strength, chemical resistance, and like properties. The present invention intends also to provide a coating liquid suitable for formation of the above transparent film, and a display device employing the transparent film coated substrate being excellent in anti-static properties and electromagnetic wave shielding properties.

An embodiment of the transparent film-coated substrate comprises a substrate and a transparent coating film formed thereon wherein the transparent coating film comprises (i) a matrix containing a silicone having a fluorine-substituted alkyl group and (ii) inorganic compound particles constituted of a shell, and a porous matter or a cavity enclosed therein, the porous matter or the cavity is kept unchanged in the formed transparent coating film.

Another embodiment of the transparent film-coated substrate is comprised of a substrate, an electroconductive layer formed on the surface of the substrate, and a transparent coating film formed on the surface of the electroconductive layer.

Wherein the transparent coating film comprises (i) a matrix containing a silicone having a fluorine-substituted alkyl group, and (ii) inorganic compound particles constituted of a shell and a porous matter or a cavity enclosed therein, the porous matter or the cavity is kept unchanged in the formed transparent coating film.

The display device of the present invention has a front face plate constituted of the aforementioned transparent film-coated substrate in which the transparent film is placed outside the front face plate.

The cathode ray tube of the present invention has a front face plate (panel) constituted of the aforementioned transparent film-coated substrate in which the transparent film is placed outside the front face plate.

DETAILED DESCRIPTION OF THE INVENTION

Figure 1A:
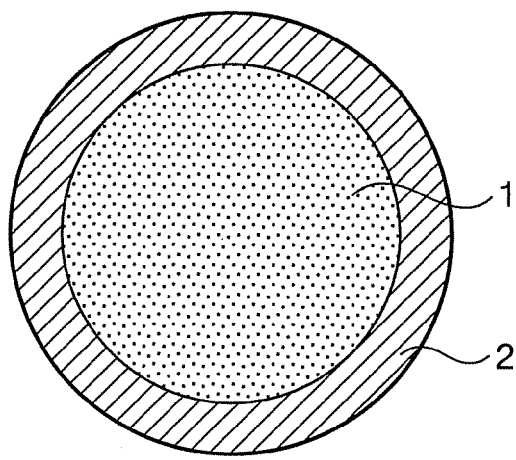
FIGS. 1A-1D are schematic sectional views of the inorganic particle constituted of a shell, and porous matter or cavity enclosed therein.

The transparent film-coated substrate is comprised of a substrate, and a transparent coating film formed on the surface of the substrate, or comprised of a substrate, an electroconductive layer formed on the surface of the substrate, and a transparent coating film formed on the surface of the electroconductive layer surface.

Substrate

The substrate employed in the present invention includes flat plates composed of glass, plastics, metal, ceramics, or the like, as molded articles shape of the substrate, such as films, sheet, and the like are exemplified, molds such as glass, bottles, PET bottles, glass plates may be used as the substrate.

In the present invention, an electroconductive layer described below may be provided on the surface of the substrate.

Electroconductive Layer

The electroconductive layer may be formed from any known electroconductive material without special limitation, provided that it has a surface resistance of not higher than $10^{12}$ Ω/□. The electroconductive layer has preferably a thickness ranging from 5 to 200 nm, more preferably from 10 to 150 nm. Within this layer thickness, the transparent film coated substrate has excellent electromagnetic wave-shielding property and excellent anti-static property. (□ means that the specimen used for surface resistance is a quadrangle such as 1 cm square.)

For the anti-static property, the electroconductive layer is formed to have a surface resistance ranging from $10^4$ to $10^{12}$ Ω/□. For the electromagnetic field shielding property, the electroconductive layer is formed to have a lower surface resistance ranging from $10^2$ to $10^4 \Omega/\square$. In the case where a transparent coating film is formed on the electroconductive layer, the surface resistance of the electroconductive layer is not substantially changed. The electroconductive layer may be formed in two or more layers.

The transparent electroconductive material includes inorganic electroconductive material such as metals, electroconductive inorganic oxides, and electroconductive carbon; electroconductive polymers such as polyacetylene, polypyrrole, polythiophene, polyaniline, polyisothianaphthene, polyazulene, polyphenylene, poly-p-phenylene, poly-p-phenylenevinylene, poly-2,5-thienylenevinylene, polyasen, and polyperinaphthalene.

The above electroconductive polymers may be doped with dopant ions if necessary.

Of the above materials, preferred are inorganic electroconductive materials including metals, electroconductive inorganic compounds, and electroconductive carbon. For formation of the electroconductive layer from the above electroconductive material, a fine particulate metal (fine particles of a metal), or a fine particulate inorganic oxide (fine particles of an electroconductive inorganic oxide) is used (hereinafter, these particles may be merely referred to as electroconductive particles in the specification).

The known fine metal particles can be used with no limitation. The metal film particles may be composed of a single component, or composed of composite metal particles containing two or more metal components.

The two or more metals constituting the fine composite metal particles may be an alloy in a solid solution state, or an eutectic mixture not in a solid solution state, or an alloy and an eutectic mixture coexisting. The fine composite metal particles are retarded particle growth because of less liability of oxidation or ionization of the metal, and have high corrosion resistance. Therefore the fine particles have high reliability such as less drop of electroconductivity or light transmittance.

The fine metal particles are selected from the group consisting of Au, Ag, Pd, Pt, Rh, Ru, Cu, Fe, Ni, Co, Sn, Ti, In, Al, Ta, and Sb. The metals for the composite metal particulates are two or more selected from the group consisting of Au, Ag, Pd, Pt, Rh, Ru, Cu, Fe, Ni, Co, Sn, Ti, In, Al, Ta, and Sb. The preferred combination of two or more metals includes Au—Cu, Ag—Pt, Ag—Pd, Au—Pd, Au—Rh, Pt—Pd, Pt—Rh, Fe—Ni, Ni—Pd, Fe—Co, Cu—Co, Ru—Ag, Au—Cu—Ag, Ag—Cu—Pt, Ag—Cu—Pd, Ag—Au—Pd, Au—Rh—Pd, Ag—Pt—Pd, Ag—Pt—Rh, Fe—Ni—Pd, Fe—Co—Pd, and Cu—Co—Pd.

When the metal of fine particle is selected from the group consisting of Au, Ag, Pd, Pt, Rh, Cu, Co, Sn, In, and Ta, a portion of the metal may be in an oxidized state, or the metal may contain an oxide of the metal. Further, a P atom or B atom may be contained by linkage.

Such a fine metal particle can be prepared by a known process, for example as shown below (see Japanese Patent Application Laid-Open No. 10-188681).

(i) A metal salt or two or more metal salts are reduced separately or simultaneously in an alcohol-water mixed solvent. In this process, a reducing agent may be added if necessary. The reducing agent includes ferrous sulfate, trisodium citrate, tartaric acid, sodium borohydrate, and sodium hypophosphite. The reduction may be conducted by heating at a temperature higher than about 100° C. in a pressure vessel.

(ii) Into a dispersion of a fine metal particle of a single component or a fine alloy particle, another fine particle or ion of a metal having a standard hydrogen electrode potential higher than that of the aforementioned metal or alloy is added to deposit the metal of a higher standard hydrogen electrode potential onto the fine metal particle and/or the fine particles. In this process, a metal having a still higher standard hydrogen electrode potential may be deposited further onto the above prepared fine composite metal particle. The metal having the highest standard hydrogen electrode potential exists preferably in a larger amount in the surface layer of the composite metal particles. The metal of the highest standard hydrogen electrode potential existing in a larger amount on the surface layer of the fine composite metal particles retard oxidation and ionization of the fine composite metal particles, and will retard the growth caused by ion migration or a like phenomenon. Further, the use of such fine composite metal particles leads the drop of electroconductivity and of light transmittance to retard because the fine composite metal particles have higher corrosion resistance.

The metal particulate has an average particle diameter ranging from 1 to 200 nm, preferably from 2 to 70 nm. Within this particle diameter range, the formed electroconductive layer is transparent. The metal particulate having an average particle diameter larger than 200 nm absorbs more light to lower the light transmittance of the particle layer and to increase the haze. Therefore, such a film-coated substrate used, for example, as a front face plate of a cathode ray tube can lower the resolution of the displayed image. On the other hand, the fine metal particles having the average particle diameter of less than 1 nm tend to increase the surface resistance of the particulate layer greatly, which may make it difficult to achieve the object of the present invention.

The applicable electroconductive inorganic particulate may be any known fine transparent electroconductive inorganic particles or particulate carbon.

The fine electroconductive inorganic oxide particles includes tin oxide; doped tin oxide doped with Sb, F, or P; indium oxide; doped indium oxide doped with Sn or F; antimony oxide, and titanium lower order oxide.

The electroconductive inorganic particulate has an average particle diameter ranging from 1 to 200 nm, preferably from 2 to 150 nm.

The electroconductive layer can be formed by application of a coating liquid for electroconductive film formation (hereinafter referred to as an electroconductive film forming liquid).

The coating liquid contains the aforementioned fine electroconductive particles and a polar solvent.

The polar solvent for the electroconductive film forming liquid includes water; alcohols such as methanol, ethanol, propanol, butanol, diacetone alcohol, furfuryl alcohol, tetrahydrofurfuryl alcohol, ethylene glycol, and hexylene glycol; esters such as methyl acetate, and ethyl acetate; ethers such as diethyl ether, ethylene glycol monomethyl ether, ethylene glycol monoethyl ether, ethylene glycol monobutyl ether, diethylene glycol monomethyl ether, and diethylene glycol monoethyl ether; ketones such as acetone, methyl ethyl ketone, acetylacetone, and acetoacetate esters. These solvents may be used singly or in combination of two or more thereof.

By use of a coating liquid containing the fine metal particles, a transparent electroconductive layer can be formed which has a surface resistance ranging from about $10^2$ to about $10^4$ $\Omega/\square$, giving the electromagnetic wave-shielding effect. For formation of the electroconductive layer for electromagnetic wave-shielding by use of the fine metal particles, the electroconductive film-forming liquid contains the fine metal particle at a concentration ranging preferably from 0.05% to 5% by weight, more preferably from 0.1% to 2% by weight.

The electroconductive film-forming liquid containing the fine metal particles at a concentration lower then 0.05% by weight tends to give a smaller thickness of the produced film resulting in insufficient electroconductivity of the film. On the other hand, at a fine metal particles concentration of higher than 5% by weight, the coating liquid tends to produce a larger thickness of the film to lower the light transmittance to deteriorate the transparency and impair the appearance of the layer.

The electroconductive film-forming liquid may contain the aforementioned electroconductive inorganic particles in addition to the fine metal particles. To obtain a transparent electroconductive layer having a surface resistance ranging from $10^2$ to $10^4$ $\Omega/\square$ for the electromagnetic wave shielding effect, the electroconductive inorganic particles may be contained in an amount of not more than 4 parts by weight based on one part of the fine metal particle. With the electroconductive inorganic particles contained in an amount of more than 4 parts by weight, the electroconductivity may be lower not to give sufficient electromagnetic wave shielding effect undesirably because the portion of the fine metal particles in electroconductive film is decreased.

The coating liquid containing both the fine metal particles and the fine electroconductive inorganic particles can produce a transparent electroconductive particulate layer having higher transmittance than the layer formed from the fine metal particle only. The incorporation of the fine electroconductive inorganic particle and the fine metal particle enable transparent electroconductive layer formation at a lower cost.

For formation of the electroconductive layer having the surface resistance ranging from about $10^4$ to $10^{12}$ $\Omega/\square$ for anti-static property, the electroconductive film-forming liquid may contain only the fine electroconductive particle. The electroconductive film-forming liquid contains the electroconductive inorganic particle at a concentration ranging preferably from 0.1% to 1% by weight, more preferably from 0.5% to 5% by weight. At the concentration of lower than 0.1% by weight of the fine electroconductive particles, the resulting film tends to be thinner, which may give insufficient anti-static property. On the other hand, at the concentration of higher than 10% by weight of the fine electroconductive particles, the resulting film tends to be thicker to lower the light transmittance to decrease the transparency and impair the appearance of the film.

The electroconductive film-forming liquid may further contain a dye or a pigment to uniformly transmit visible light throughout the visible light wavelength range.

The solid content (the total amount of the fine metal particles, and/or the fine electroconductive particles except for the fine metal particle, and an optionally added additive such as a dye and a pigment) in the coating liquid is preferably not higher than 15% by weight, more preferably in the range from 0.15% to 5% by weight in view of the fluidity of the liquid, and the dispersibility of the fine metal particle and other particulate components in the coating liquid.

The electroconductive film-forming liquid employed in the present invention may contain a component for a matrix which functions as the binder for the fine metal particles and fine electroconductive particle except for the fine metal particle after the film formation. The matrix component may be any known material. In the present invention, the binder material is preferably one or more oxide precursors selected from the group consisting of precursors of silica, composite oxides containing silica component, zirconia, and antimony oxide. Particularly hydrolysis-polycondensation products of organic silanes such as alkoxysilanes, and silicic acid prepared by dealkalization of alkali silicate are preferable as precursors. A resin for a paint may also be useful therefor.

The matrix component is contained in an amount ranging from 0.01 to 0.5 part by weight, preferably from 0.03 to 0.3 part by weight based on one part by weight of the fine metal particles.

For higher dispersibility of the fine electroconductive particles, the electroconductive film-forming liquid may contain an organic stabilizer. The organic stabilizer includes specifically gelatin; polyvinyl alcohol; polyvinylpyrrolidone; polybasic carboxylic acids such as oxalic acid, malonic acid, succinic acid, glutaric acid, adipic acid, sebacic acid, maleic acid, fumaric acid, phthalic acid, and citric acid, and salts thereof; sulfonate salts; organic sulfonate salts; phosphate salts; organic phosphate salts; and heterocyclic compounds; and mixtures thereof.

The amount of the organic stabilizer used depends on the kind of the organic stabilizer, the diameter of the fine electroconductive particles, and so forth, ranging preferably from 0.005 to 0.5 part by weight, more preferably from 0.01 to 0.2 part by weight based on one part of the particles. With the amount of less than 0.005 part by weight, the organic stabilizer tends not to give sufficient dispersibility, whereas with the amount of more than 0.5 part by weight, it may lower the electroconductivity.

Formation of Electroconductive Layer

The electroconductive layer is formed by applying the aforementioned electroconductive film-forming liquid onto a substrate, and drying the applied liquid.

For example, the electroconductive film-forming liquid is applied on a substrate by dip coating, spinner coating, spray coating, roll coater coating, flexographic printing, or a like coating method, and the applied liquid is dried at a temperature ranging from room temperature to about 90° C.

The electroconductive film-forming liquid which contains the aforementioned matrix component may be heat-treated after application to cure the matrix component. In the heat treatment, the dried coating film after the drying is heated to cure the matrix component. The heat treatment temperature is preferably not lower than 100° C., more preferably ranges from 150° C. to 300° C. The heat treatment at a temperature lower than 100° C. does not necessarily cure the matrix component sufficiently. The upper limit of the heat treatment temperature should be below the temperature of decomposition, melting, or burning of the substrate, depending on the kind of the substrate.

The matrix component may be cured by electromagnetic wave irradiation, treatment in an atmosphere of a cure-promoting gas, or other method in place of the heat treatment.

Transparent Coating Film

A transparent coating film is formed on the surface of the aforementioned substrate or the aforementioned electroconductive layer in the present invention. The transparent coating film comprises inorganic particulate and a matrix as described below.

Inorganic Compound Particle

The inorganic compound particulate employed in the present invention comprises a shell, and a porous matter or a cavity enclosed by the shell. The porous matter or the cavity in the inorganic particle is kept unchanged in the formed transparent film.

FIGS. 1A-1D show schematically sectional views of the inorganic compound particle. In FIGS. 1A-1D, the numeral 1 denotes a shell layer, the numeral 2 denotes a porous matter, and the numeral 3 denotes a cavity.

Figure 1B:
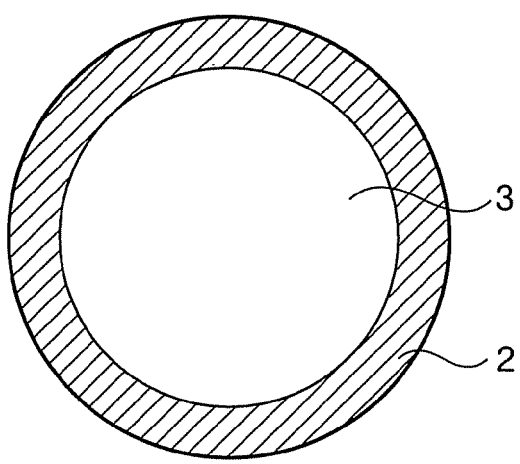
Figure 1C:
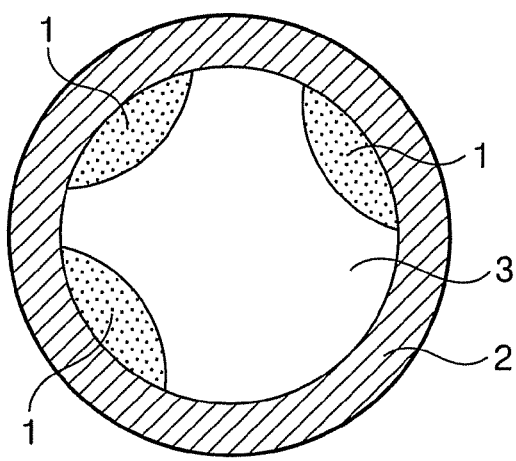
Figure 1D:
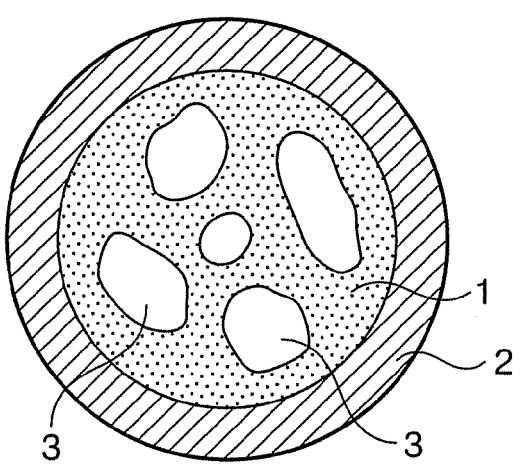

The inorganic particle employed in the present invention may have a porous matter enclosed by the shell as shown in FIG. 1A, may have a cavity as shown in FIG. 1B, or may have a porous matter partially filled and a cavity enclosed by the shell as shown in FIGS. 1C and 1D.

The cavity 3 contains a solvent (mentioned later), a gas, or a like matter employed in preparation of the inorganic compound particles.

The inorganic compound particles have an average particle diameter ranging preferably from 5 to 300 nm, more preferably 10 to 200 nm. The average diameter of the used inorganic compound particles is suitably selected corresponding to the thickness of the transparent coating film to be formed.

The thickness of the shell layer ranges preferably from 1 to 20 nm, more preferably 2 to 15 nm. With the thickness less than 1 nm, the shell layer does not always cover completely the particle. The incomplete coverage of the particle may permit ready penetration of a fluorine-containing matrix precursor such as monomers and oligomers for forming a matrix (mentioned later) into the inorganic compound particle to decrease the porosity inside and to decrease the effect of the low refractivity. With the thickness more than 20 nm, the constitution ratio of the shell layer is higher to decrease the ratio of the porous matter to reduce the effect of the low refractivity, although the penetration of the fluorine-containing matrix precursor like the fluorine-containing silicone monomers or oligomers is prevented.

The particle being entirely cavitied inside (FIG. 1B) and having the shell layer of less than 1 nm thick may be collapsed, whereas the particle having the shell layer of more than 20 nm thick has higher constituting ratio of the shell layer and lower cavity volume ratio in the particle to decrease the effect of the low refractivity.

The overall void ratio of the inorganic compound particle employed in the present invention is preferably not less than 10% by volume. The particle having the interior filled with the porous matter has a void ratio ranging from 10% to 20% by volume. The particle having a cavity inside has void ratio of higher than 20% by volume, preferably higher than 22% by column.

The shell (layer) of the inorganic compound particle is preferably constituted mainly of silica. The shell (layer) may contain a non-silica component, which is specifically oxides selected from the group of $Al_2O_3$, $B_2O_3$, $TiO_2$, $ZrO_2$, $SnO_2$, $CeO_2$, $P_2O_5$, $Sb_2O_3$, $Sb_2O_5$, $MoO_3$, $ZnO$, and $WO_3$.

The compound for constituting the porous matter (hereinafter occasionally referred to a porous material) inside the shell layer includes silica, combination of silica and other inorganic compound, $CaF_2$, $NaF$, $NaAlF_6$, and $MgF$. Of these, particularly preferred are composite oxides composed of silica and a non-silica inorganic oxide. The non-silica inorganic oxide is one or more of the compounds selected from the group consisting of $Al_2O_3$, $B_2O_3$, $TiO_2$, $ZrO_2$, $SnO_2$, $CeO_2$, $P_2O_5$, $Sb_2O_3$, $Sb_2O_5$, $MoO_3$, $ZnO$, and $WO_3$. The compound constituting the porous matter (porous material) contains silica ($SiO_2$) and the non-silica inorganic compound (in term of oxide: $MO_x$) in a molar ratio $MO_x/SiO_2$ ranging preferably from 0.0001 to 1.0, more preferably from 0.0001 to 0.3. The porous material of molar ratio $MO_x/SiO_2$ of less than 0.0001 cannot readily be prepared, and even if it could be obtained, it would not give lower refractive index. At the molar ratio $MO_x/SiO_2$ of higher than 1.0, the pore volume may be smaller and the refractive index may not be low because of the smaller ratio of the silica.

The inorganic compound particle, which has a shell layer constituted mainly of silica, in the present invention, has a refractive index of not higher than 1.41 preferably.

When such an inorganic compound particulate has inside a porous matter mainly constituted of silica, the refractive index thereof ranges from 1.37 to 1.41, and the void ratio ranges from 10% to 20% by volume. When the inside of the shell is cavitied (including the inside having a porous matter and a cavity), the refractive index is lower than 1.37, preferably lower than 1.36 and the void ratio is higher than 20% by volume, preferably higher than 22% by volume.

The use of the specific inorganic particles having a lower refractive index leads to obtaining transparent film coated substrate having especially excellent antireflection property.

The refractive index is measured as described below. Firstly, coating liquids for refractive index measurement are prepared by mixing an $SiO_2$ matrix forming liquid (M) and the inorganic compound particle at weight ratios of the matrix (weight in term of $SiO_2$) to inorganic compound particles (weight in term of oxides) of 100:0, 90:10, 80:20, 60:40, 50:50, and 25:75. The coating liquids are applied respectively on a silicon wafer having the surface kept at 50° C. by spinner coating at 300 rpm. The coated films are heat-treated at 160° C. for 30 minutes. The refractive indexes of the formed coating films for refractive index measurement are measured by an ellipsometer. Then the obtained refractive indexes are plotted as a function of the particle mixing ratio (Particle: (oxide)/[Particle:(oxide)+Matrix:$SiO_2$]. The plots are extrapolated to 100% particle content. This extrapolated value is taken as the refractive index of the inorganic particles.

The void volume is estimated by calculating the air volume from the difference between the above obtained refractive index and the refractive index (1.45) of pure $SiO_2$ to obtain the void ratio.

The cavity inside the shell is filled partly with the solvent used in the preparation of the particles, gas and the porous matter. The solvent in the cavity may contain the unreacted particle precursor, and catalyst employed. The cavity-filling matter may be a single component, or a mixture of two or more components. The inorganic compound particle contains silica and non-silica inorganic compound (in term of oxide: $MO_x$) in a molar ratio $MO_x/SiO_2$ ranging preferably from 0.0001 to 0.1, more preferably from 0.0001 to 0.3.

The aforementioned porous matter or the cavity in the shell layer of the inorganic compound particle are maintained in the formed transparent film as mentioned before.

Figure 2:
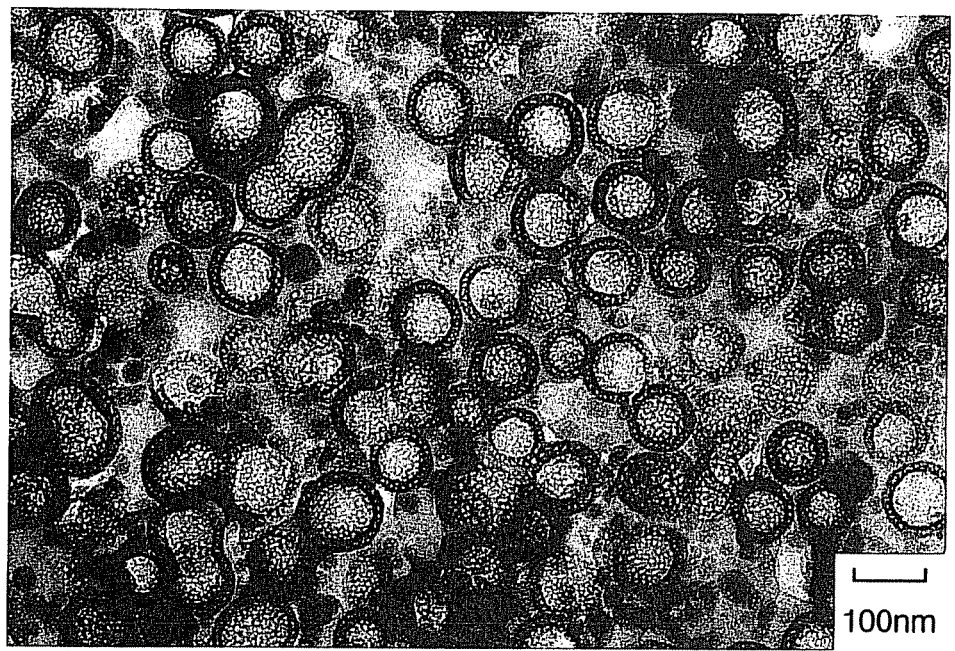
FIG. 2 is a TEM photograph of a cross-section of the inorganic particles (having a cavity enclosed by the shell).

FIG. 2 is a TEM photograph of a cross-section of the inorganic compound particles having a cavity enclosed by the shell.

The shell layer is composed of silica (thickness 1.5 nm; particle diameter 96 nm), having a refractive index of 1.31, a void ratio of 31%. The ratio of the cavity is calculated to be 32% assuming that the inside is occupied by air. Therefore, the cavities are formed obviously in the shell.

Figure 3:
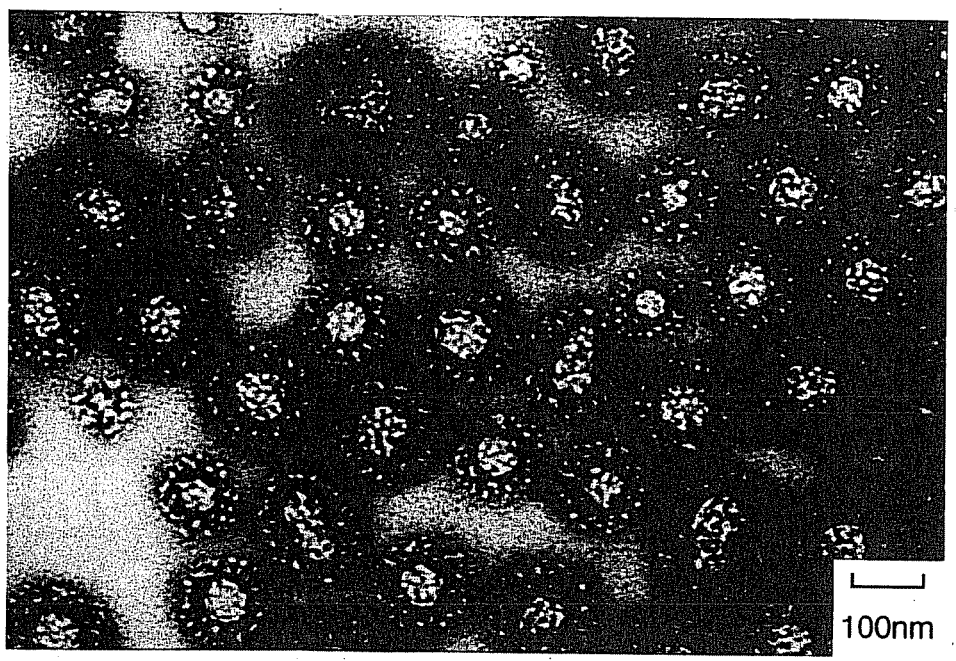
FIG. 3 is a TEM photograph of a cross-section of the transparent film containing the inorganic particle (having a cavity enclosed by the shell).

FIG. 3 is a TEM photograph of a cross-section of the inorganic compound particles in the transparent coating film formed from the inorganic compound particles and the matrix explained later, the particles having a cavity inside the shell. FIG. 3 shows clearly that the cavities are retained in the formed transparent film without penetration of the matrix component into the cavities.

Preparation of Inorganic Compound Particles

The inorganic compound particles are produced suitably, for example, by a process for producing composite oxide colloid particles disclosed in Japanese Patent Application Laid-Open No. 7-133105.

Specifically, the inorganic compound particles constituted of silica and a non-silica inorganic compound can be produced through Steps 1 to 3 shown below.

Step 1: Preparation of Particles of Porous Material Precursor

In this Step 1, aqueous alkali solutions of a silica source (raw material) and a non-silica inorganic compound source (raw material) are separately prepared, or an aqueous solution of a mixture of the silica source and the non-silica inorganic compound source is prepared preliminarily. The aqueous solution or solutions are added gradually to an aqueous alkali solution having a pH 10 or higher with stirring corresponding to the composite ratio of the composite oxide to form precursor particles of the porous material (hereinafter referred to as porous material precursor particles).

The silica source includes silicate salts of alkali metals, ammonium, or organic bases. The alkali metal silicates include sodium silicate (water glass) and potassium silicate.

The organic base includes quaternary ammonium salts such as tetraethylammonium salt: amines such as monoethanolamine, diethanolamine, and triethanolamine. The ammonium silicate and the organic base silicates include alkaline solutions prepared by adding ammonia, a quaternary ammonium hydroxide, or an amine compound to a silicic acid solution.

The source material for the non-silica inorganic compound includes alkali-soluble inorganic compound, specifically including oxo-acids of the element selected from Al, B, Ti, Zr, Sn, Ce, P, Sb, Mo, Zn, W and so forth; alkali metal salts, alkaline earth metal salts, ammonium salts, and quaternary ammonium salts of the oxo-acids. More specifically, preferred are sodium aluminate, sodium tetraborate, zirconylammonium carbonate, potassium antimonate, potassium stannate, sodium aluminosilicate, sodium molybdate, cerium ammonium nitrate, and sodium phosphate.

On mixing the above aqueous source material solutions, the pH of the mixed aqueous solution changes immediately. However, no control is necessary for controlling the pH in a certain range. The pH of the resulting aqueous solution will reach finally to a certain level depending on the kind of inorganic oxides and the mixing ratio. The speed of the mixing of the aqueous solution is not specially limited.

In preparation of a porous material precursor particles for the inorganic compound particles, which has a porous composite oxide as the inside porous material, a liquid dispersion of seed particles may be used as the starting material. The seed particle includes fine particle of inorganic oxides of $SiO_2$, $Al_2O_3$, $TiO_2$, $ZrO_2$, and the like and composite oxides thereof. Usually a sol of the oxide may be used. The liquid dispersion of the porous material precursor particles obtained by the above preparation method may be used as the seed particle dispersion. When the seed particle dispersion is used, the pH value of the seed particle dispersion is adjusted to pH 10 or higher, and thereto the aqueous solution of the aforementioned compound is added with stirring. In this operation also, the pH of the dispersion need not be controlled. The use of the seed particles will facilitate the particle size control of the prepared porous material precursor particles with uniformity of the particle size.

The above silica source materials and the inorganic compound source materials have respectively a high solubility in alkaline region. However, in mixing of the both source materials in the pH region of high solubility, the formed oxo-acid ions such as silicate ions and aluminate ions having low solubilities will precipitate as a composite oxide to grow fine particles or precipitation thereof on the seed particles to grow in size. Therefore, in the precipitation and growth of the particles, the pH control as conducted in the conventional process is not necessary.

In this Step 1, the silica and the non-silica inorganic compound are used in a molar ratio ($MO_x/SiO_2$) ranging preferably from 0.05 to 2.0, more preferably from 0.2 to 2.0, where the inorganic compound is calculated in terms of oxide ($MO_x$). Within this composite ratio, the smaller ratio of the silica will give a larger pore volume in the porous material. At an $MO_x/SiO_2$ ratio higher than 2.0, the pore volume in the porous material tends to increase little, whereas at the $MO_x/SiO_2$ ratio lower than 0.05, the pore volume tends to be smaller. Especially, in case of formation of a cavity in the inorganic shell layer, the molar ratio $MO_x/SiO_2$ ratio ranges preferably from 0.25 to 2.0. At the molar ratio $MO_x/SiO_2$ lower than 0.25, the cavity is not always formed in the subsequent Step 2.

Step 2: Removal of Non-Silica Inorganic Compound from Porous Material Precursor Particles In Step 2, from the porous material precursor particles, non-silica inorganic compound (elements other than silicon and oxygen) is selectively removed at least partly. Specifically, the inorganic compound in the porous material precursor particles is removed by dissolution by a mineral acid or an organic acid, or removed by ion exchange by contact the obtained porous material precursor particles dispersion with a cationic ion exchange resin.

The porous material precursor particles prepared in Step 1 have a network structure in which silicon and an element constituting the inorganic compound are linked through oxygen. From the porous material precursor particles, the inorganic compound (elements other than silicon and oxygen) is removed to obtain porous particles having a higher porosity and larger pore volume. Such a porous particle constitutes the porous matter inside the shell.

The particles having a cavity inside the shell can be prepared by increasing the amount of removal of the non-silica inorganic compound from the porous matter precursor particles.

Preferably, a protecting silica film is formed on the surface of the porous material precursor particles before the removal of the non-silica inorganic compound from the porous material precursor particles. The protecting silica film is formed by adding a silicic acid solution obtained by dealkalizing the alkali metal salt or a hydrolyzable organic silicon compound to the liquid dispersion of the porous material precursor particles prepared in Step 1. The protecting silica film has a thickness ranging preferably from 0.5 to 15 nm. This protecting silica film formed in this step is porous and thin, so that it does not prevent the removal of the non-silica inorganic compound from the porous material precursor particles.

The formation protecting silica film leads to removal of the aforementioned non-silica inorganic compound from the particle while retaining the particle shape of the porous material precursor particles.

Further, the formation of protecting silica film prevents, in the outer shell layer formation, clogging (closing) of pores of the porous particles by the hydrolyzable organic silicon compound or the silicic acid as the silica shell forming component, enabling formation of the silica shell mentioned later without decreasing the pore volume.

When the amount of the inorganic compound to be removed from the porous material precursor particles is small, the protection film need not be formed since the particles are not broken by the removal operation.

For preparation of particles having a cavity inside the shell, the formation of the protecting silica film is particularly preferred. In preparation of particles having a cavity inside the shell, the inorganic compound is removed to leave a precursor of particle having a cavity inside the shell constituted of the protecting silica film, a solvent inside the protecting silica film, and the remaining undissolved part of the porous material. Formation of the silica shell layer on this particle precursor produces the inorganic compound particle having a shell constituted of the protecting silica film and the silica shell layer, and inorganic particles having a cavity inside.

In formation of the protecting silica film, the amount of the silica source is preferably less, insofar as the particle shape can be retained. An excessive amount of the silica source results in an excessive thickness of the protecting silica film, which may render difficult the removal of the non-silica inorganic compound from the porous material precursor particles.

The hydrolyzable organic silicon compound for formation of the protecting silica film includes alkoxysilanes represented by general Formula: $R_nSi(OR')_{4-n}$ where R and R' are respectively a hydrocarbon group such as alkyl, aryl, vinyl, and acryl; n is an integer of 0, 1, 2, or 3. Of these, preferred are tetraalkoxysilanes such as tetramethoxysilane, tetraethoxysilane, and tetraisopropoxysilane.

In the film formation, a mixed solution of the alkoxysilane, pure water, and an alcohol containing a small amount of an alkali or acid as the catalyst is added to a liquid dispersion of the aforementioned porous material precursor particles, whereby the alkoxysilane is hydrolyzed to form a silicic acid polymer and the formed silicic acid polymer is allowed to deposit on the surface of the porous material precursor particles. In this operation, in place of the mixed solution, the alkoxysilane, the alcohol, and the catalyst may be concurrently added to the porous material precursor particles dispersion. The alkali catalyst includes ammonia, alkali metal hydroxides, and amines. The acid catalyst includes inorganic acids and organic acids.

In the case where the dispersion medium of the porous material precursor particles is water only, or contains water in a larger amount relative to the organic solvent, the protecting silica film can be formed by use of a silicic acid solution. In this case, the silicic acid in a prescribed amount is added to the dispersion, and simultaneously an alkali is added thereto to deposit the silicic acid onto the surface of the porous material precursor particles. The silicic acid and the alkoxysilane may be used in combination for the protecting silica film formation.

As described above, from the porous material precursor particles, the non-silica inorganic compound is removed to obtain a dispersion of porous material particles or of precursor of the particles having cavity inside the shell.

Step 3: Formation of Silica Shell Layer

In Step 3, a hydrolyzable organic silicon compound or silicic acid solution is added to the porous material particle (including the precursor of particle having a cavity inside the shall) dispersion prepared in Step 2. Thereby, a silica shell layer is formed from a polymer of hydrolyzable organic silicon compound or a silicic acid solution to coat the surface of the porous particles (precursor particles for cavity formation). In the formation of silica shell, the use of singly hydrolyzable organosilicon compound is preferable. When silicic acid solution is used, it is preferred to mix with hydrolyzable organosilicon compound. The portion of silicic acid in the mixture of silicic acid and hydrolyzable organosilicon compound is preferably not more than 30% by weight.

The hydrolyzable organic silicon compound for formation of the silica shell layer includes aforementioned alkoxysilanes represented by general Formula: $R_nSi(OR')_{4-n}$ where R and R' are respectively a hydrocarbon group such as alkyl, aryl, vinyl, and acryl; n is an integer of 0, 1, 2, or 3. Of these, preferred are tetraalkoxysilanes such as tetramethoxysilane, tetraethoxysilane, and tetraisopropoxysilane.

In the shell formation, a mixed solution of the alkoxysilane, pure water, and an alcohol containing a small amount of an alkali or acid as the catalyst is added to a liquid dispersion of the aforementioned porous material particles, whereby the alkoxysilane is hydrolyzed to form a silicic acid polymer and the formed silicic acid polymer is allowed to deposit on the surface of the porous material particles to form the shell layer. In this operation, in place of the mixed solution, the alkoxysilane, the alcohol, and the catalyst may be individually added to the dispersion. The alkali catalyst includes ammonia, alkali metal hydroxides, and amines. The acid catalyst includes inorganic acids and organic acids.

In the case where the dispersion medium of the porous particles (the precursor of particle having cavity inside the shell) is water only, or mixed solvent containing water in a larger amount relative to an organic solvent, the shell layer may be formed by use of a silicic acid solution. The silicic acid solution herein means an aqueous solution of a low polymer of silicic acid prepared by dealkalization of aqueous solution of an alkali metal silicate such as water glass by ion exchange.

When the silicic acid is used for the shell layer formation, the silicic acid is added to the liquid dispersion of the porous material particles (the precursor of particle having a cavity inside the shell), and simultaneously an alkali is added thereto to deposit a low polymer of the silicic acid onto the surface of the porous particles to form the shell layer (hereinafter the obtainable particle is called the shelled particle). The silicic acid and the alkoxysilane may be used in combination for the shell layer formation.

The organic silicon compound for shell layer formation is added to the porous particle dispersion in an amount to enable to coat sufficiently the surface of the porous particles. Specifically, the organic silicon compound for shell layer foundation is added so as to form the silica shell having the thickness in the range of 1 to 20 nm. With a protecting silica film having been provided, the organic silicon compound or the silicic acid is used in an amount to obtain the total thickness of the protecting silica film and the silica shell layer ranging from 1 to 20 nm.

Subsequently, the dispersion of the shelled particles is heat-treated to compact the formed silica shell layer. The heat treatment temperature is not limited provided that the fine pores in the silica shell layer are clogged, preferably ranging from 80 to 300° C. For heat treatment at a temperature higher than the boiling point, a pressure reaction vessel may be used. The heat treatment at a temperature lower than 80° C. may not cause clogging of the fine pores of the silica shell to compact the shell layer, or may require much time for the treatment. On the other hand, whereas the heat treatment at 300° C. or higher for a long time may compact the inner porous material-constituting compound (porous matter), not achieving the low refractivity undesirably.

The inorganic compound particles obtained as above have a low refractive index of not higher than 1.41. The porosity of the inorganic compound particles owing to the porous material contained inside or a cavity inside gives the low refractive index.

Matrix

The transparent coating film contains a fluorine-substituted alkyl-containing silicone component as the matrix. The fluorine-substituted alkyl-containing silicone component includes preferably those having the constituting unit represented by any of the formulas (1) to (3) below:

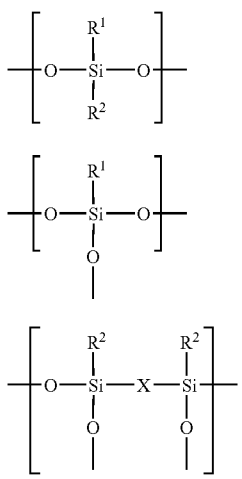

where $R^1$ is a fluoroalkyl or perfluoroalkyl group of 1-16 carbon atoms; $R^2$ is an alkyl, halogenated alkyl, aryl, alkylaryl, arylalkyl, alkenyl, or alkoxy group of 1-16 carbon atoms, a hydrogen atom, or a halogen atom; and X is a group represented by —$(C_aH_bF_c)$—, a is an integer of 1-12, b+c=2a, b is an integer of 0-24, c is an integer of 0-24. X is preferably a group having a fluoroalkylene group and an alkylene group.

The matrix having the above constituting units is usually derived from a fluorine-containing silicone compound having a fluoroalkyl group represented by Formula (4) or (5).

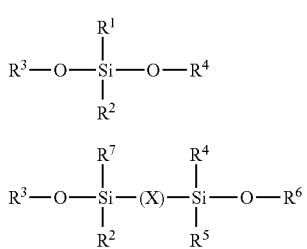

where $R^1$ is a fluoroalkyl or perfluoroalkyl group of 1-16 carbons, preferably 3-12 carbons; $R^2$—$R^7$ are respectively an alkyl group of 1-16, preferably 1-4 carbon atoms, a halogenated alkyl group of 1-6, preferably 1-4 carbon atoms, an aryl group of 6-12, preferable 6-10 carbon atoms, an alkylaryl or arylalkyl group of 7-14, preferably 7-12 carbon atoms, an alkenyl group of 2-8, preferably 2-6 carbon atoms, or an alkoxy group of 1-6, preferably 1-3 carbon atoms, a hydrogen atom, or a halogen atom; and X is a group represented by —$(C_aH_bF_c)$—, wherein a is an integer of 1-12, b+c=2a, b is an integer of 0-24, c is an integer of 0-24. X is preferably a group having a fluoroalkylene group and an alkylene group.

Specifically, the fluorine-containing silicone compound is exemplified by heptadecafluorodecylmethydimethoxysilane, heptadecafluorodecyltrichlorosilane, heptadecafluorodecyltrimethoxysilane, trifluorpropyltrimethoxysilane, tridecafluorooctyltrimethoxysilane, and a methoxysilane compound represented by the formula $(MeO)_3SiC_2H_4C_6F_{12}C_2H_4Si(MeO)_3$.

The matrix containing a fluorine-substituted alkyl-containing silicone component makes the resulting transparent coating film hydrophobic, which retards penetration of moisture or a chemical such as an acid or an alkali thereto, even when the transparent coating film is not sufficiently compact, or is porous, or has cracks or voids. Further with this transparent coating film, the surface of the substrate or fine particles of metal or the like in the underlying electroconductive layer does not cause reaction with the moisture or a chemical such as an acid, or a base. Thus such a transparent coating film has excellent chemical resistance.

The matrix formed from a fluorine-substituted alkyl-containing silicone component gives, to the resulting transparent coating film, not only the hydrophobicity but also a slipping property (low friction resistance) to give excellent scratch resistance.

Further, in the case where an electroconductive layer is employed, the matrix containing a fluorine-substituted alkyl-containing silicone component can have a contraction coefficient nearly equal to that of the underlying electroconductive layer, so that the resulting transparent coating film has excellent adhesiveness to the underlying electroconductive layer. Furthermore, in heat treatment of the transparent coating film, the electroconductive layer does neither cause exfoliation, nor cause local failure of electric contact in the transparent electroconductive layer. Thus, the obtainable substrate formed electroconductive layer and transparent layer thereon secures sufficient electroconductivity in the entire film.

The transparent coating film containing the fluorine-substituted alkyl-containing silicone component and the inorganic compound particles has not only the high scratch resistance but has high strength such as rubber eraser strength, and nail strength, and has high pencil hardness.

In the present invention, the matrix may contain a component other than the aforementioned fluorine-substituted alkyl-containing silicone component. The other component mentioned here includes inorganic oxides such as silica, zirconia, and titania; and composite oxides such as silica-zirconia, silica-titania, and titania-zirconia. Of these, silica is particularly preferred.

The matrix contains the fluorine-substituted alkyl-containing silicone component having the constitution units represented by the above Formulas (1) to (3) at a content ranging preferably from 0.1% to 70% by weight, more preferably from 1% to 30% by weight in terms of $SiO_2$ in the matrix.

At a content of less than 0.1% by weight of the fluorine-substituted alkyl-containing silicone represented by the above Formulas (1) to (3) in the matrix in terms of $SiO_2$, the formed transparent coating film may not have a sufficient slipping property and may not have sufficient scratch resistance.

The other component such as an inorganic oxide precursor, has a larger contraction coefficient than the fluorine-substituted alkyl-containing silicone component. Therefore, increase of the other component will increase the shrinkage of the transparent coating film, which may cause warpage of the substrate in the heat treatment (curing) of the transparent coating film. In case of underlying the electroconductive film, exfoliation of the electroconductive layer or local electric contact failure may be caused or by the difference in shrinkage between films. As a result, total electroconductivity of film becomes insufficient. The increased shrinkage compactifies the film excessively, which may prevent the pore formation to weaken the effect of decrease of the refractive index of the transparent coating film. Further, the less content of the fluorine compound of a low electron density tends to render the decrease of the refractive index of the transparent film insufficient. Further the less content of the fluorine-substituted alkyl-containing silicone component may make the hydrophobicity of the transparent film insufficient, resulting low chemical resistance.

At a content of higher than 70% by weight of the fluorine-substituted alkyl-containing silicone represented by the above Formulas (1) to (3) in the matrix in terms of $SiO_2$, the formed transparent coating film may become excessively porous to cause drop of the film strength, drop of strengths such as the rubber eraser strength and scratch strength, and insufficient adhesiveness to the substrate or the electroconductive layer.

The matrix in the present invention has preferably a refractive index of not higher than 1.6. In the case where the matrix contains additionally a component other than the fluorine-substituted alkyl-containing silicone component, the refractive index of the mixture thereof is preferably not higher than 1.6.

The weight ratio of the matrix to the inorganic particles in the transparent coating film (matrix/inorganic compound particles, both in terms of the oxide) ranges preferably from 0.1 to 10, more preferably from 0.2 to 5 in the present invention.

Transparent Film-Forming Liquid

The aforementioned transparent coating film is formed with a transparent film-forming liquid containing, for example, a matrix precursor and the inorganic compound particles.

Matrix Precursor

The matrix precursor includes the fluorine-containing silicone compounds represented by Formula (4) or (5) shown before, hydrolysis products thereof, and polycondensation products of the hydrolysis product (hereinafter referred to as a fluorine-substituted alkyl-containing silicone precursor).

The fluorine-substituted alkyl-containing silicone precursor has a number-average molecular weight ranging preferably from 500 to 10000, more preferably 700 to 2500 in terms of polystyrene.

The matrix precursor may contain the aforementioned inorganic oxide precursor and/or an inorganic composite oxide precursor as necessary.

The inorganic oxide precursor and/or the inorganic composite oxide precursor contained as necessary includes preferably silica precursors: in particular, preferred are partial hydrolysis products and hydrolysis-polycondensation products of hydrolyzable organic silicon compounds, and silicic acid derived from aqueous alkali metal silicate solution by dealkalization, especially, the silica precursor which is a hydrolysis-polycondensation products of the alkoxysilane represented by General Formula [A] below:

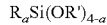  [A]

where R is a vinyl group, an aryl group, an acryl group, an alkyl group of 1-8 carbon atoms, a hydrogen atom, or a halogen atom; R' is a vinyl group, an aryl group, an acryl group, an alkyl group of 1-8 carbon atoms, a hydrogen atom, a group of —$C_2H_4OC_nH_{2n+1}$ (n=1-4), or a hydrogen atom; and a is an integer of 1-3.

The alkoxysilane includes tetramethoxysilane, tetraethoxysilane, tetraisopropoxysilane, tetrabutoxysilane, tetraoctylsilane, methyltrimethoxysilane, methyltriethoxysilane, ethyltriethoxysilane, methyltriisopropoxysilane, vinyltrimethoxysilane, phenyltrimethoxysilane, and dimethyldimethoxysilane.

The silica precursor is a number-average molecular weight ranging preferably from 500 to 10000 in terms of polystyrene. The silica precursor having a molecular weight of lower than 500 in terms of polystyrene may remain unhydrolyzed in the coating liquid, which may cause nonuniform application of the transparent coating film forming liquid on the electroconductive layer, or less adhesion of the transparent coating film to the electroconductive film even if it can be uniformly applied. The silica precursor having a molecular weight of higher than 10000 in terms of polystyrene tends to lower the strength of the formed coating film.

In the mixture of the fluorine-substituted alkyl-containing silicone precursor and the inorganic oxide precursor and/or the inorganic composite oxide precursor, the fluorine-substituted alkyl-containing silicone precursor constitutes the portion from 0.1% to 70%, more preferably from 1% to 30% by weight in terms of oxides thereof.

With the fluorine-substituted alkyl-containing silicone precursor in a mixing amount of less than 0.1% by weight (in terms of oxides), the formed transparent coating film shows a large shrinkage of the whole film owing to increasing the transparent portion of the optionally added other component (inorganic oxide, etc.). This shrinkage may cause warpage of the substrate in the heat treatment (curing) of the transparent coating film. In case of underlying the electroconductive film, exfoliation of the electroconductive layer or local electric contact failure may be caused by the difference in shrinkage between films. As a result, total electroconductivity of film becomes insufficient. The increased shrinkage compacts the transparent film excessively, which may lower the porosity of the film to weaken the effect of decrease of the refractive index of the transparent coating film. Further the lower content of the fluorine-substituted alkyl-containing silicone precursor may decrease the hydrophobicity of the transparent film, resulting in low chemical resistance.

With the fluorine-substituted alkyl-containing silicone precursor in a mixing amount of more than 70% by weight, the formed transparent coating film may become excessively porous to cause drop of the film strength, and insufficient adhesiveness to the substrate or the underlying electroconductive layer.

In the transparent coating film formed by use of a transparent coating film-forming liquid containing a fluorine-substituted alkyl-containing silicone precursor as the matrix precursor as in the present invention, a part of the hydrophobic fluorine-substituted alkyl group covers the fine metal particles on the electroconductive layer surface to form a protection layer composed of hydrophobic fluorine-substituted alkyl group-containing silicone component at the interface between the electroconductive layer and the transparent layer, thereby improving the chemical resistance of the electroconductive layer.

The fluorine-substituted alkyl-containing silicone precursor tends to have a two-dimensional chain structure. Such a fluorine-substituted alkyl-containing silicone precursor of two-dimensional chain structure can readily be adsorbed by or readily bond to the inorganic compound particles in comparison with the inorganic oxide precursor like the silica matrix precursor. Therefore, in the transparent coating film-forming liquid, the aggregation of the inorganic compound particles is prevented by the fluorine-substituted alkyl-containing silicone precursor to disperse the inorganic compound particles uniformly in the transparent coating film-forming liquid. This transparent coating film-forming liquid forms a transparent coating film in which the inorganic compound particles are uniformly dispersed. Such a transparent coating film-forming liquid enables formation of a transparent coating film on a large substrate with uniform dispersion of the inorganic compound particles with excellent film appearance.

Further, the process of the transparent coating film formation by use of the aforementioned transparent coating film-forming liquid is industrially reliable and gives a high product yield.

In application and drying treatment of the transparent film-forming liquid, the evaporation of the solvent increases the concentration of the inorganic compound particles and the fluorine-substituted alkyl-containing silicone precursor in the upper layer portion of the transparent coating film. In the transparent coating film, the fluorine-containing silicone compound shrinks less and retains the porosity, showing a low refractive index, and the inorganic compound particles has inherently a low refractive index, thereby the refraction index of the surface portion of the transparent coating layer makes lower. Since the fluorine-substituted alkyl-containing silicone precursor is concentrated the surface portion of the transparent coating layer as mentioned above, the transparent film surface has excellent slipping property, and has a high scratch strength. In the lower portion of the transparent coating layer, the inorganic oxide precursor like the silica matrix precursor other than the fluorine-substituted alkyl-containing silicone precursor are concentrated. This inorganic oxide precursor has a refractive index higher than that of the fluorine-substituted alkyl-containing silicone precursor and of the inorganic compound particles. Therefore, the transparent coating film has a refractive index gradient such that the refractive index decreases from the layer bottom portion toward the layer surface portion of the transparent coating film, which lowers the reflectivity, especially the luminous reflection factor, of the transparent coating film.

Thus, the transparent coating film formed from the coating liquid containing the aforementioned matrix precursor has a low refractive index, which gives a transparent film-coated substrate having excellent anti-reflection property.

Preparation of Transparent Coating Film-forming Liquid

The transparent coating film-forming liquid is prepared by mixing a liquid dispersion containing the matrix precursor, and the aforementioned inorganic compound particles.

The matrix precursor dispersion is prepared by dissolving or dispersing the fluorine-substituted alkyl-containing silicone precursor, and optionally an precursor of an oxide like silica in a water-alcohol mixed solvent. The matrix precursor dispersion may also be prepared by dissolving or dispersing a substitute alkyl-containing precursor and optionally a precursor to an oxide like silica in a water-alcohol mixed solvent, and hydrolyzing them in the presence of an acid catalyst.

The inorganic compound particles is contained in the transparent film-forming liquid in an amount ranging preferably from 0.05% to 3%, more preferably from 0.2% to 2% by weight in terms of the oxide. At the concentration of the inorganic compound particles of lower than 0.05% by weight in the transparent film-forming liquid, the formed transparent coating film has insufficient anti-reflection property owing to insufficient amount of the inorganic compound particles, whereas at the concentration higher than 3% by weight, cracks may be formed or the film strength may be lowered.

The matrix precursor is contained in the coating liquid at a concentration ranging preferably from 0.05% to 10%, more preferably from 0.1% to 5.0% by weight.

At the concentration of the matrix precursor of lower than 0.05% by weight in terms of the oxide in the coating liquid, the formed film is insufficient in water resistance and anti-reflection property owing to insufficient thickness of the formed film. At such a concentration of the matrix precursor, a sufficient thickness of the layer may not be obtained by one application, and may give nonuniform thickness of the film by repeated application. On the other hand, at the concentration of the matrix precursor of higher than 10% by weight in terms of the oxide, cracks may be caused or the film strength may be lower, or the anti-reflection property may be insufficient owing to the larger thickness of the film.

The weight ratio of the matrix precursor to the inorganic compound particles (matrix precursor/inorganic compound particles, both in terms of the oxide) ranges preferably from 0.1 to 10, more preferably from 0.2 to 5.

The transparent film-forming liquid may contain further a fine particulate composed of a low-refractivity material such as magnesium fluoride, or may contain an additive such as an electroconductive particulate and/or a dye or a pigment in a small amount not to hinder the transparency or the anti-reflection property of the transparent film.

Formation of Transparent Film

The method of formation of the transparent film is not specially limited. The film can be formed by a wet thin-film forming process in which the aforementioned coating liquid is applied by dip coating, spinner coating, spray coating, roll coater coating, flexographic printing or the like method, and the applied liquid is dried.

The thickness of the formed transparent coating film ranges preferably from 50 to 300 nm, more preferably from 80 to 200 nm to obtain high water resistance, and excellent anti-reflection property with low bottom reflectivity and low luminous reflection factor. The transparent coating film of the thickness of less than 50 nm may be inferior in film strength, water resistance, anti-reflection property, and so forth, whereas the transparent film of the thickness of more than 300 nm may cause cracking therein, or have lower film strength, or insufficient anti-reflection property owing to the excessive film thickness.

The coating film formed by application of the transparent coating film-forming liquid during or after drying, in the present invention, may be heat-treated at a temperature of 100° C. or higher; or subjected to irradiation of an electromagnetic wave having a wavelength shorter than visible light such as ultraviolet ray, electron ray, X-ray, and γ-ray; or exposed to an atmosphere of an active gas such as ammonia. This treatment can promote the cure of the film-forming components and can increase the hardness of the formed transparent film.

An anti-glaring transparent film-coated substrate causing less glaring can be obtained, in formation of the coating film by application of the transparent film-forming liquid, by applying the transparent film-forming liquid by spraying with the substrate kept at a temperature from about 40 to about 90° C. to form ring-shaped rises.

The transparent film may be constituted of two or more coating layers having different refractive indexes. For example, formation of transparent coating films having refractive indexes decreasing successively from the substrate surface can give transparent film-coated substrate having excellent anti-reflection property. In this case, the lower transparent coating film need not contain the aforementioned inorganic compound particles and the fluorine-substituted alkyl-containing silicone component.

In the case where the transparent film is formed on a electroconductive film surface, the difference of the refractive index between the electroconductive film and the transparent film is preferably not less than 0.3. With the refractive index difference of less than 0.3, the anti-reflection property may be insufficient.

Display Device

The display device of the present invention has a front face plate constituted of the aforementioned transparent film-coated substrate, and the transparent film is placed on the outside face of the front face plate.

Of the transparent film-coated substrates of the present invention, the one having an electroconductive layer of a surface resistance of not higher than $10^{12}$ Ω/□ has excellent anti-reflection property on the surface of the electroconductive layer in the visible light region and the near infrared region, and is suitable as a front face plate of a display device (e.g., a glass panel of a cathode-ray tube).

The display device of the present invention is a device for displaying an image electrically such as Brown tubes (CRT), fluorescent display devices (FIP), plasma display devices (PDP), and liquid crystal display device (LCD), having a front face plate constituted of the transparent film-coated substrate. The front face plate may be a display face panel having an electroconductive film and a transparent film formed thereon, or a front face plate having an electroconductive film and a transparent film on a substrate provided separately from the display face panel.

A display device having a conventional front face plate, during running, would collect dirt on the front face plate, or emit an electromagnetic wave through the front face plate. However, the one provided with a front face plate having an electroconductive layer of the surface resistance of $10^{12}$ Ω/□ does not tend to collect dirt, and in particular the one provided with a front face plate having an electroconductive layer of the surface resistance of $10^2$-$10^4$ Ω/□ will shield effectively the electromagnetic wave emission and an electromagnetic field generated by the electromagnetic wave.

Light reflection on the front face plate of the display device hinders observation of the displayed image. However, the display device of the present invention has a front face plate constituted of a substrate coated with a transparent film of low refractivity to lower the bottom reflectivity and luminous reflection factor, whereby the light reflection can be effectively prevented in the wavelength range of visible light and near infrared light.

This display device, which has the transparent coating film of high scratch resistance on the surface of the front face plate, is not scratched on the face to maintain clear image formation for a long term.

The front face plate of a Brown tube, which is constituted of a transparent film-coated substrate containing a small amount of a dye or pigment in the transparent electroconductive layer or the transparent coating film, absorbs an inherent wavelength of light with the dye or pigment to improve the contrast of the image displayed by the Brown tube.

The front face plate of the Brown tube is coated with the transparent coating film containing inorganic compound particles of low refractive index of the present invention to give excellent anti-reflection property, thereby enabling clear image display without scattering of visible light. This transparent film adheres well to the electroconductive layer to serve also as a protection film to maintain the high display performance for a long term. Further, this stable electroconductivity of the electroconductive film keeps the anti-static property and the electromagnetic shielding property for a long term.

The transparent film-coated substrate of the present invention has a transparent coating film which contains inorganic compound particles of a low refraction index and a fluorine-substituted alkyl-containing silicone component. In this transparent film-coated substrate, the transparent film has high adhesiveness to the substrate or the electroconductive layer, and has high scratch resistance, high water resistance, and high chemical resistance. Further, the transparent coating film has a low bottom reflectivity and a low luminous reflection factor to lead to excellent anti-reflection property over a broad wavelength region of the visible light.

The transparent coating film-forming liquid of the present invention is useful for formation of the aforementioned transparent film-coated substrate.

The display device of the present invention has a front face plate which has an excellent anti-reflection property and a high water resistance, thereby giving a sharp display image without scattering of visible light and maintaining the display performance for a long term. With an electroconductive film formed, the high chemical resistance of the transparent coating film maintains the electroconductivity for a long term without deterioration of the anti-static property and the electromagnetic wave-shielding performance.

EXAMPLES

The present invention is described in more detail by reference to examples without limiting the invention thereto.

Preparation Example 1

Preparation of Inorganic Compound Particle P-1
(Porous Matter Enclosed by Shell)

A 100 g portion of silica sol having average particle diameter of 5 nm and containing $SiO_2$ at a concentration of 20% by weight, and 1,900 g of pure water were mixed to prepare a reaction mother liquor. The mother liquor was heated to 80° C. The mother liquor had a pH of 10.5. To the mother liquor were added simultaneously 9,000 g of aqueous sodium silicate solution (1.5% by weight in terms of $SiO_2$) and 9,000 g of sodium aluminate (0.5% by weight in terms of $Al_2O_3$) by keeping the temperature at 80° C. The pH of the reaction solution rose to 12.5 immediately after the addition of the sodium silicate and the sodium aluminate, and was nearly constant thereafter. After completion of the addition of the solutions, the reaction liquid was cooled to room temperature and washed by ultrafiltration to obtain a liquid dispersion (A) of a porous material precursor particle containing $SiO_2 \cdot Al_2O_3$ at a solid matter concentration of 20% by weight. (Step 1)

To 500 g of this dispersion (A) of porous material precursor particle, 1,700 g of pure water was added, and the mixture was heated to 98° C. Thereto, by keeping this temperature, 3,000 g of silicic acid solution ($SiO_2$: 3.5% by weight) obtained by dealkalizing an aqueous sodium silicate solution contacted with cation exchange was added to form a protecting silica film on the surface of the porous material precursor particle. The obtained dispersion of porous material precursor particle was washed by ultrafiltration to adjust the solid matter concentration to 13% by weight. To 500 g of this liquid dispersion of porous material precursor particle, 1,125 g of pure water was added, and further concentrated hydrochloric acid (35.5% by weight) was added to adjust the pH to 1.0 to remove aluminum.

Then with addition of 10 L (Litter) of aqueous hydrochloric acid solution (pH 3) and 5 L (Litter) of pure water, the dissolved aluminum salt was separated by ultrafiltration to obtain a liquid dispersion (B) of a porous $SiO_2 \cdot Al_2O_3$ particles with the aluminum partly removed. (Step 2)

A 1,500 g portion of the above liquid dispersion (B) of the porous particle, 500 g of pure water, 1,750 g of ethanol, and 626 g of aqueous 28% ammonia were mixed, and the mixture was heated to 35° C. Thereto 104 g of ethyl silicate ($SiO_2$: 28% by weight) was added to form a silica shell layer composed of ethyl silicate hydrolysis-polycondensation product on the surface of the porous particles. Then the liquid was concentrated to a solid matter concentration of 5% by weight by an evaporator. Thereto aqueous 15% by weight ammonia solution was added to adjust pH to 10. The liquid was heat-treated at 180° C. for 2 hours in an autoclave. The solvent was replaced with ethanol by use of an ultrafiltration membrane to obtain a liquid dispersion of inorganic compound particle (P-1) at a solid matter concentration of 20% by weight. (Step 3)

Table 1 shows the properties of this particle (P-1): the average particle diameter, the molar ratio $SiO_2/MO_x$ of the whole particle (including the formed shell layer) and the refractive index. The average particle diameter was measured by dynamic light scattering, and the refractive index was measured by the procedure shown below in the present invention.

Measurement of Refraction Index of Particle (1) Coating liquids for refractive index measurement were prepared by mixing an $SiO_2$ matrix forming liquid (M) prepared in Preparation Example 9 shown later and the inorganic compound particle at weight ratios of the matrix (weight in term of $SiO_2$) to inorganic compound particles (weight in term of oxides) of 100:0, 90:10, 80:20, 60:40, 50:50, and 25:75 respectively in terms of the oxide.

(2) The coating liquids were applied respectively on a silicon wafer having the surface kept at 50° C. by a spinner method at 300 rpm. The coated films were heat-treated at 160° C. for 30 minutes. The refractive indexes of the respective formed coating films for refractive index measurement were measured respectively by an ellipsometer.

(3) The obtained refractive indexes were plotted as a function of the particle mixing ratio:
(Particle: $(MO_x+SiO_2)/[Particle:(MO_x+SiO_2)+Matrix: SiO_2]$). The plots were extrapolated to 100% particle content.

(4) The void volume ratio was estimated by calculating the air volume from the difference between the above obtained refractive index and the refractive index (1.45) of pure $SiO_2$ to obtain the void volume ratio.

Preparation Example 2

Preparation of Inorganic Compound Particle P-2
(Porous Matter Enclosed by Shell)

To 100 g of the liquid dispersion (A) of the porous material precursor particle obtained above, 1,900 g of pure water was added and the mixture was heated to 95° C. By keeping this temperature, 27,000 g of an aqueous sodium silicate solution (1.5% by weight in terms of $SiO_2$), and 27,000 g of an aqueous sodium aluminate solution (0.5% by weight in terms of $Al_2O_3$) were added gradually concurrently to grow particles by utilizing, as seed, the particles of the liquid dispersion (A) of the porous material precursor particle. After completion of the addition, the mixture was cooled to room temperature, and washed and concentrated by ultrafiltration to obtain a liquid dispersion (C) of a porous material precursor particle containing $SiO_2.Al_2O_3$ at a solid matter concentration of 20% by weight. (Step 1)

A 500 g portion of this liquid dispersion (C) of the porous material precursor particle was treated in the same manner as in Preparation Example 1 to form a protecting silica film of Step 2. The liquid mixture was treated for aluminum removal. Then the silica shell layer was formed with ethylsilicate hydrolysis product as Step 3 to prepare the liquid dispersion of the inorganic compound particle (P-2). Table 1 shows the properties of the particle.

Preparation Example 3

Preparation of Inorganic Compound Particle P-3
(Porous Matter Enclosed by Shell)

To 100 g of the liquid dispersion (C) of the porous material precursor particle obtained above, 1,900 g of pure water was added and the mixture was heated to 95° C. By keeping this temperature, 7,000 g of an aqueous sodium silicate solution (1.5% by weight in terms of $SiO_2$), and 7,000 g of an aqueous sodium aluminate solution (0.5% by weight in terms of $Al_2O_3$) were added gradually concurrently to grow particles. After completion of the addition, the mixture was cooled to room temperature, and washed and concentrated by ultrafiltration to obtain a liquid dispersion (D) of a porous material precursor particle containing $SiO_2.Al_2O_3$ at a solid matter concentration of 13% by weight.

To 500 g of this liquid dispersion (D) of the porous material precursor particle, 1,125 g of pure water was added, and thereto hydrochloric acid (35.5%) was added dropwise to adjust the pH to 1.0. The liquid mixture was treated for aluminum removal.

To 500 g of this liquid dispersion (D) of the porous material precursor particle, 1,125 g of pure water was added, and thereto hydrochloric acid (35.5%) was added dropwise to adjust the pH to 1.0. The liquid mixture was treated for aluminum removal.

The dissolved aluminum salt was removed with addition of 10 L of an aqueous hydrochloric acid solution and 5 L of pure water by ultrafiltration to obtain a liquid dispersion (E) of a porous material precursor particle composed of $SiO_2.Al_2O_3$ with the aluminum partly removed.

A 1,500 g portion of the above liquid dispersion (E) of the porous particle, 500 g of pure water, 1,750 g of ethanol, and 626 g of aqueous 28% ammonia were mixed, and the mixture was heated to 35° C. Thereto 210 g of ethyl silicate ($SiO_2$ content: 28% by weight) was added to form a silica shell layer composed of ethyl silicate hydrolysis-polycondensation product on the surface of the porous particles. Then the liquid was condensed to a solid matter concentration of 5% by weight by an evaporator. Thereto aqueous 15% by weight ammonia solution was added to adjust pH to 10. The liquid was heat-treated at 180° C. for 2 hours in an autoclave. The solvent was replaced with ethanol by ultrafiltration to obtain a liquid dispersion of inorganic compound particle (P-3) (solid matter concentration: 20% by weight). Table 1 shows the properties of the particle.

Preparation Example 4

Preparation of Inorganic Compound Particle P-4
(Cavity Enclosed by Shell)

A 10 g portion of silica sol having average particle diameter of 5 nm and containing $SiO_2$ at a concentration of 20% by weight, and 190 g of pure water were mixed to prepare a reaction mother liquor. The mother liquor was heated to 95° C. This mother liquor had a pH of 10.5. To the mother liquor, were added simultaneously 24,900 g of aqueous sodium silicate solution (1.5% by weight in terms of $SiO_2$) and 36,800 g of aqueous sodium aluminate solution (0.5% by weight in terms of $Al_2O_3$) while keeping the temperature at 95° C. The pH of the reaction solution rose to 12.5 immediately after the addition of the sodium silicate and the sodium aluminate, and was nearly constant thereafter. After completion of the addition of the solutions, the reaction liquid was cooled to room temperature, and washed by ultrafiltration to obtain a liquid dispersion (F) of a porous material precursor particle containing $SiO_2 \cdot Al_2O_3$ at a solid matter concentration of 20% by weight. (Step 1)

To 500 g of this liquid dispersion (F) of porous material precursor particle, 1,700 g of pure water was added, and the mixture was heated to 98° C. Thereto, by keeping this temperature, 3,000 g of silicic acid solution ($SiO_2$ concentration: 3.5% by weight) obtained by dealkalizing an aqueous sodium silicate solution contacted with cation exchange resin was added to form a protecting silica film on the surface of the porous material precursor particle. The obtained liquid dispersion of porous material precursor particle was washed by ultrafiltration to adjust the solid matter concentration to 13% by weight. To 500 g of this liquid dispersion of porous material precursor particle, 1,125 g of pure water was added, and further concentrated hydrochloric acid (35.5% by weight) was added to adjust the pH to 1.0 to remove aluminum. Then with addition of 10 L of aqueous hydrochloric acid solution (pH 3) and 5 L of pure water, the dissolved aluminum salt was separated by ultrafiltration to obtain a liquid dispersion of a particle precursor. (Step 2)

A 1,500 g portion of the above liquid dispersion of the particle precursor, 500 g of pure water, 1,750 g of ethanol, and 626 g of aqueous 28% ammonia were mixed, and the mixture was heated to 35° C. Thereto 104 g of ethyl silicate ($SiO_2$ content: 28% by weight) was added to form a silica shell layer composed of ethyl silicate hydrolysis-polycondensation product on the surface of the particle precursor. Then the liquid was condensed to a solid matter concentration of 5% by weight by an evaporator. Thereto aqueous 15% by weight ammonia solution was added to adjust pH to 10. The liquid was heat-treated at 180° C. for 2 hours in an autoclave. The solvent was replaced with ethanol by ultrafiltration to obtain a liquid dispersion of inorganic compound particle (P-4) at a solid matter concentration of 20% by weight. (Step 3)

The cross section of the particle was observed by transmission type electron microscope (TEM). The particles had a cavity enclosed by the shell layer as shown in FIG. 2.

Preparation Example 5

Preparation of Inorganic Compound Particle P-5
(Porous Matter Enclosed by Shell)

A porous material precursor particle composed of $SiO_2 \cdot SnO_2$ having a solid matter concentration of 20% by weight was obtained in the same manner as in preparation of the inorganic compound particle (P-1) except that 9,000 g of aqueous 5% by weight potassium stannate solution was used as the $SnO_2$ source in place of sodium aluminate in preparation of the inorganic compound particle (P-1). This precursor particle was treated for formation of a protecting silica film in the same manner as treatment of inorganic compound particle (P-1), and treated for Sn removal (the same treatment as the aluminum removal in Preparation Example 1), and for formation of silica shell layer to obtain a liquid dispersion of an inorganic compound particle (P-5). Table 1 shows the property of the inorganic compound particle.

Preparation Example 6

Preparation of Inorganic Compound Particle P-6
(Comparative Example: Shell Not Formed)

An inorganic compound particle (P-6) was prepared in the same manner as preparation of the inorganic compound particle (P-1). A 100 g portion of a silica sol having average particle diameter of 5 nm and containing $SiO_2$ at a concentration of 20% by weight, and 1,900 g of pure water were mixed. The mixture was heated to 80° C. This reaction liquid had a pH of 10.5. To the reaction liquid were added simultaneously 9,000 g of aqueous sodium silicate solution (1.5% by weight in terms of $SiO_2$) and 9,000 g of sodium aluminate solution (0.5% by weight in terms of $Al_2O_3$) with keeping the temperature at 80° C. The pH of the reaction solution rose to 12.5 immediately after the addition of the sodium silicate and the sodium aluminate, and was nearly constant thereafter. After completion of the addition of the solutions, the reaction liquid was cooled to room temperature, and washed by ultrafiltration to obtain a liquid dispersion of a porous material particle (P-6) containing $SiO_2 \cdot Al_2O_3$ at a solid matter concentration of 20% by weight.

Preparation Example 7

Preparation of Inorganic Compound Particle P-7
(Comparative Example: Shell Not Formed)

A 100 g portion of methylsilicate ($SiO_2$ content: 39% by weight) and 530 g of methanol were mixed, and thereto 79 g of an aqueous 28% by weight ammonia solution was added. The mixture was stirred at 35° C. for 24 hours. The particle was washed, and the solvent was replaced with ethanol by ultrafiltration. As a result, a liquid dispersion of a porous silica particle (P-7) was obtained which has a solid matter concentration of 20% by weight. Table 1 shows the properties of the porous particle.

TABLE 1

| | | Inorganic Compound Particle | | | | | | | | |
|---|---|---|---|---|---|---|---|---|---|---|
| | | Porous matter precursor particle | | Porous matter particle | Silica shell layer | | Inorganic compound particle | | | |
| No. | Oxide composition | Molar ratio $MO_x/SiO_2$ | Molar ratio $MO_x/SiO_2$ | Average particle diameter (nm) | Thickness of protecting silica layer (nm) | Thickness[1] (nm) | Molar ratio $MO_x/SiO_2$ | Average particle diameter (nm) | Refractivity | Void ratio (Volume %) |
| P-1 | Alumina/silica | 0.171 | 0.0118 | 24 | 1 | 3 | 0.00786 | 30 | 1.40 | 11.1 |
| P-2 | Alumina/silica | 0.195 | 0.0105 | 48 | 2 | 6 | 0.00695 | 60 | 1.37 | 17.7 |
| P-3 | Alumina/silica | 0.196 | 0.0076 | 73 | — | 10 | 0.00478 | 93 | 1.35 | 22.2 |

TABLE 1-continued

| | | Porous matter precursor particle | | Porous matter particle | Silica shell layer | | Inorganic compound particle | | | |
|---|---|---|---|---|---|---|---|---|---|---|
| No. | Oxide composition | Molar ratio $MO_x/SiO_2$ | Molar ratio $MO_x/SiO_2$ | Average particle diameter (nm) | Thickness of protecting silica layer (nm) | Thickness[1] (nm) | Molar ratio $MO_x/SiO_2$ | Average particle diameter (nm) | Refractivity | Void ratio (Volume %) |
| P-4 | Alumina/silica | 0.288 | 0.0035 | 76 | 3 | 10 | 0.00217 | 96 | 1.31 | 31.1 |
| P-5 | Tin oxide/silica | 0.116 | 0.0121 | 22 | 1 | 4 | 0.00806 | 30 | 1.40 | 11.1 |
| P-6 | Porous silica-alumina[2] | | | | Not formed | | 0.171 | 20 | 1.56 | 2.5 |
| P-7 | Porous silica[2] | | | | Not formed | | 0 | 25 | 1.43 | 4.4 |

[1] Particles P-1, P-2, P-4 and P-5 have a protecting silica film formed: the thickness of the silica shell layer including the thickness of the protecting silica film
[2] Particles P-6 and P-7 employ originally porous particle without a shell layer
[3] Particle P-4 has a cavity inside Preparation Example 8

Preparation of Electroconductive Particle Liquid Dispersion (1) Liquid dispersions (S-1, S-2) of a metal composite particle (Q-1, Q-2) were prepared in a manner shown below.

To 100 g of pure water, trisodium citrate was preliminarily added in an amount corresponding to 0.01 part by weight based on one part by weight of fine composite metal particle to be formed. Thereto, an aqueous silver nitrate solution and an aqueous palladium nitrate solution were added in a total amount of 10% by weight in terms of the metals at the weight ratio of the metals constituting the composite metal particle as shown in Table 2. Further thereto, an aqueous ferrous sulfate solution was added in an amount equivalent to the total moles of the silver nitrate and the palladium nitrate in the liquid. The liquid mixture was stirred in a nitrogen atmosphere for one hour to obtain a liquid dispersion of the composite metal particle having the composition shown in Table 2. The resulting dispersion was washed with water by centrifugation to remove impurities. The separated solid matter was dispersed. Thereto the solvent (1-ethoxy-2-propanol) shown in Table 4 was added. The liquid dispersion was evaporated by a rotary evaporator to remove water and to concentrate it. Thereby metal particle liquid dispersions (S-1, S-2) were obtained which had solid contents as shown in Table 2.

(2) A liquid dispersion (S-3) of a tin-doped indium oxide particle (Q-3) was prepared in a manner shown below.

A 79.9 g portion of indium nitrate was dissolved in 686 g of water. Separately, 12.7 g of potassium stannate was dissolved in a 10% by weight potassium hydroxide. These two solutions were added to 1000 g of water kept at 50° C. in two hours by keeping the pH at 11 during the addition. From the resulting liquid dispersion, the formed hydrate of tin-doped indium oxide was collected by filtration, washed, dried, baked at 350° C. for 3 hours in the air, and further baked at 600° C. for 2 hours in the air to obtain tin-doped indium oxide particle (Q-3). This particle was dispersed in pure water at a concentration of 30% by weight. The pH of the dispersion was adjusted to 3.5 by addition of aqueous nitric acid. The liquid mixture was treated for pulverization by means of a sand mill at 30° C. for 3 hours to prepare a sol. This sol was treated for ion exchange to remove nitrate ions. Pure water was added thereto to prepare the liquid dispersion (S-3) of particle tin-doped indium oxide (ITO) (Q-3) at the concentration shown in Table 2.

(3) A liquid dispersion (S-4) of an antimony-doped tin oxide particle (Q-4) was prepared in a manner shown below.

In 100 g of methanol, were dissolved 57.7 g of tin chloride and 7.0 g of antimony chloride. The solution was added gradually into 1000 g of pure water at 90° C. in 4 hours with stirring for hydrolysis. The resulting precipitate was collected by filtration, washed, and dried, and then fired in the air at 500° C. for 2 hours to obtain particle antimony-doped tin oxide. A 30 g portion of this powder was added to 70 g of an aqueous potassium hydroxide solution (corresponding to 3.0 g of KOH). The mixture was grinded by means of a sand mill at 30° C. for 3 hours to prepare a sol. This sol was contacted with ion exchange for resin dealkalization. Pure water was added thereto to prepare the liquid dispersion (S-4) of antimony-doped tin oxide (ATO) (Q-4) at the concentration shown in Table 2.

Preparation Example 9 c) Preparation of Matrix-Forming Component Liquids
Preparation of Matrix-Forming Component Liquid (M-1)

A mixture of 50 g of ethyl orthosilicate (TEOS) ($SiO_2$: 28% by weight), 9.52 g of heptadecafluorodecyltrimethoxysilane, 194.6 g of ethanol, 1.4 g of concentrated nitric acid, and 34 g of pure water was stirred at room temperature for 5 hours to prepare a liquid (M-1) containing a matrix-forming component at a concentration of 5% by weight in terms of $SiO_2$.
Preparation of Matrix-Forming Component Liquid (M-2)

A mixture of 50 g of ethyl orthosilicate (TEOS) ($SiO_2$: 28% by weight), 47.5 g of heptadecafluorodecyltrimethoxysilane, 194.6 g of ethanol, 1.4 g of concentrated nitric acid, and 34 g of pure water was stirred at room temperature for 5 hours to prepare a liquid (M-2) containing a matrix-forming component at a concentration of 5% by weight in terms of $SiO_2$.
Preparation of Matrix-Forming Component Liquid (M-3)

A mixture of 50 g of ethyl orthosilicate (TEOS) ($SiO_2$: 28% by weight), 6.57 g of $(CH_3O)_3SiC_2H_4C_6F_{12}C_2H_4Si(CH_3O)_3$, 194.6 g of ethanol, 1.4 g of concentrated nitric acid, and 34 g of pure water was stirred at room temperature for 5 hours to prepare a liquid (M-3) containing a matrix-forming component at a concentration of 5% by weight in terms of $SiO_2$.
Preparation of Matrix-Forming Component Liquid (M-4)

A mixture of 50 g of ethyl orthosilicate (TEOS) ($SiO_2$: 28% by weight), 12.14 g of heptadecafluorodecyltrimethoxysilane, 194.6 g of ethanol, 1.4 g of concentrated nitric acid, and 34 g of pure water was stirred at room temperature for 5 hours to prepare a liquid (M-4) containing a matrix-forming component at a concentration of 5% by weight in terms of $SiO_2$.

Preparation of Matrix-Forming Component Liquid (M-5)

A mixture of 50 g of ethyl orthosilicate (TEOS) ($SiO_2$: 28% by weight), 20.65 g of heptadecafluorodecyltrimethoxysilane, 194.6 g of ethanol, 1.4 g of concentrated nitric acid, and 34 g of pure water was stirred at room temperature for 5 hours to prepare a liquid (M-5) containing a matrix-forming component at a concentration of 5% by weight in terms of $SiO_2$.

Preparation of Matrix-Forming Component Liquid (M-6)

A mixture of 50 g of ethyl orthosilicate (TEOS) ($SiO_2$: 28% by weight), 194.6 g of ethanol, 1.4 g of concentrated nitric acid, and 34 g of pure water was stirred at room temperature for 5 hours to prepare a liquid (M-6) containing a matrix-forming component at a concentration of 5% by weight in terms of $SiO_2$.

Preparation Example 10 d) Preparation of Electroconductive Film-Forming Liquid

Electroconductive film-forming liquids (CS-1)-(CS-3) were prepared by mixing the liquid dispersion (S-1)-(S-3), the matrix-forming component mixture (M-6), ethanol, and 1-ethoxy-2-propanol in a composition ratio shown in Table 4.

TABLE 2

Electroconductive Fine Particle

| Particle liquid dispersion No. | Electroconductive Particle | | | Solid matter concentration in electroconductive particle liquid dispersion (wt %) |
|---|---|---|---|---|
| | No. | Component | Weight ratio | Average Particle diameter (nm) | |
| S-1 | Q-1 | Ag/Pd | 8/2 | 8 | 10 |
| S-2 | Q-2 | Ag/Pd | 6/4 | 8 | 10 |
| S-3 | Q-3 | ITO | — | 80 | 20 |
| S-4 | Q-4 | ATO | — | 10 | 20 |

ITO: Tin-doped indium oxide
ATO: antimony-doped tin oxide

TABLE 3

Matrix-Forming Component Liquid Dispersion

| Dispersion | Composition of matrix-forming component | | Solid matter concentration (wt %) |
|---|---|---|---|
| | Component | Amount (g) | |
| M-1 | Ethyl orthosilicate | 50 | 5 |
| | Heptadecafluorodecyltrimethoxysilane | 9.52 | |
| M-2 | Ethyl orthosilicate | 50 | 5 |
| | Heptadecafluorodecyltrimethoxysilane | 47.5 | |
| M-3 | Ethyl orthosilicate | 50 | 5 |
| | $(CH_3O)_3SiC_2H_4C_6F_{12}C_2H_4Si(CH_3O)_3$ | 6.57 | |
| M-4 | Ethyl orthosilicate | 50 | 5 |
| | Heptadecafluorodecyltrimethoxysilane | 12.14 | |
| M-5 | Ethyl orthosilicate | 50 | 5 |
| | Heptadecafluorodecyltrimethoxysilane | 20.65 | |
| M-6 | Ethyl orthosilicate | 50 | 5 |

TABLE 4

Electroconductive Film-Forming Liquid

| Liquid | Formulation | | Weight parts | Solid matter concentration (wt %) |
|---|---|---|---|---|
| CS-1 | Solid matter liquid dispersion | S-1 | 10 | 0.24 |
| | | M-6 | 4 | |
| | Dispersion medium | Ethanol | 368.4 | |
| | | 1-ethoxy-2-propanol | 117.6 | |
| CS-2 | Solid matter liquid dispersion | S-2 | 10 | 0.24 |
| | | M-6 | 4 | |
| | Dispersion medium | Isopropyl alcohol | 368.4 | |
| | | t-butanol | 117.6 | |
| CS-3 | Solid matter liquid dispersion | S-3 | 10 | 2.00 |
| | Dispersion medium | ethanol | 54 | |
| | | 1-ethoxy-2-propanol | 36 | |
| CS-4 | Solid matter liquid dispersion | S-4 | 10 | 2.00 |
| | Dispersion medium | ethanol | 54 | |
| | | 1-ethoxy-2-propanol | 36 | |

Example 1

Preparation of Transparent Film-Forming Liquid (B-1)

To the above liquid (M-1) containing the matrix-forming component, was added a mixed solvent of ethanol/butanol/diacetone alcohol/isopropyl alcohol (mixing weight ratio of 2:1:1:5). Thereto, the above liquid dispersion of the inorganic compound particle (P-1) was added to prepare a transparent film-forming liquid (B-1). Table 5 shows the concentration of the inorganic compound particle in terms of a solid matter, and the concentration of the matrix-forming component in terms of $SiO_2$.

Production of Transparent Film-Coated Glass Plate

The transparent film-forming liquid (B-1) was applied to form a transparent film in a thickness of 100 nm on a glass base plate having a surface kept at 40° C. by a spinner method under the conditions of 100 rpm and 90 seconds. The film was dried and heated at 160° C. for 30 minutes to obtain a transparent film-coated glass plate (G-1).

The above transparent film-coated glass plate was tested for haze and reflectivity. The haze was measured by a haze computer (Model: 3000A, manufactured by Nippon Denshoku K.K.). The reflectivity was measured according to JIS Z8727 by a reflectometer (Model: MCPD-2000, manufactured by Ohtsuka Denshi K.K.). The minimum reflectivity in the wavelength range from 400 nm to 700 nm is defined as the bottom reflectivity.

The average reflectivity in the wavelength range from 400 nm to 700 nm is defined as the luminous reflection factor which was measured according to JIS Z8727. The diameter of the fine particle was measured by a micro-track particle size tester (manufactured by Nikkiso Co. Ltd.).

The film strength was evaluated by rubber eraser strength and scratch strength as shown below.

Rubber Eraser Strength

A piece of rubber eraser (1K, produced by Lion Corp.) was set on the transparent film-coated glass plate with a load of 1±0.1 Kg applied on the rubber eraser. The rubber eraser was moved forward and backward 25 times at a stroke of about 25 mm. The formed scrapings were blown away by compressed air at each reciprocating movement. After 25 times of the reciprocating movement, the surface of the transparent film was examined visually at a distance of 45 cm apart from the surface under illumination of 1000 lx.

Evaluation Standard:
  A: No scratch is observed.
  B: Color of reflection light of the fluorescent lamp light is changed (from violet to red).
  C: No reflection of the fluorescent lamp light is observed, and scratch is observed.
  D: The base plate is bared.

Scratch Strength

A standard test needle (Hardness: HRC-60, diameter 0.5 mm, produced by Rockwell Co.) was set on the transparent film with a load of 1±0.3 Kg. The needle was moved to sweep the surface at a stroke of 30-40 mm. The surface of the coating film was examined visually 45 cm apart from the surface under illumination of 1000 lx.

Evaluation Standard:
  A: No scratch is observed.
  B: Color of reflection of light of the fluorescent lamp light is changed (from violet to red).
  C: No reflection of the fluorescent lamp light is observed, and scratch is observed.
  D: The base plate is bared.

Table 6 shows the results.

Examples 2 to 6

Preparation of Transparent Film-Forming Liquid (B-2 to B-6)

The liquid (M-1)-(M-4) containing a matrix-forming component, a mixed solvent of ethanol/butanol/diacetone alcohol/isopropyl alcohol (mixing weight ratio of 2:1:1:5), and the above liquid dispersion of the inorganic compound particle (P-2, P-3, and P-5) or particle having cavity (P-4) were mixed to prepare a transparent film-forming liquid (B-2)-(B-6). Table 5 shows the concentrations of the particle, and the concentration of the matrix-forming component in terms of a solid matter.

Production of Transparent Film-Coated Glass Plates

The transparent film-forming liquid (B-2)-(B-6) was applied to form a transparent film in a thickness of 100 nm on a glass base plate having a surface kept at 40° C. by a spinner method under the conditions of 100 rpm and 90 seconds. The applied film was dried, and heated at 160° C. for 30 minutes to obtain a transparent film-coated glass plate (G-2)-(G-6).

The obtained transparent film-coated glass was evaluated in the same manner as in Example 1. Table 6 shows the results.

Comparative Examples 1-5

Preparation of Transparent Film-Forming Liquid (B-7 to B-11)

The liquid (M-1), (M-5), or (M-6) containing the above matrix-forming component, a mixed solvent of ethanol/butanol/diacetone alcohol/isopropyl alcohol (mixing weight ratio of 2:1:1:5), and the above liquid dispersion of the inorganic compound particle (P-6, P-7, and P-1) were mixed to prepare a transparent film-forming liquid (B-7)-(B-11). Table 5 shows the concentrations of the particle, and the concentration of the matrix-forming component in terms of a solid matter.

Production of Transparent film-Coated Glass Plates

The transparent film-forming liquid (B-7)-(B-11) was applied to form a transparent film in a thickness of 100 nm on a glass base plate having a surface kept at 40° C. by a spinner method under the conditions of 100 rpm and 90 seconds. The film was dried, and heated at 160° C. for 30 minutes to obtain a transparent film-coated glass plate (G-7)-(G-11).

The obtained transparent film-coated glass was evaluated in the same manner as in Example 1. Table 6 shows the results.

TABLE 5

| | Transparent Film-Forming Liquid | | | | |
|---|---|---|---|---|---|
| Liquid | Inorganic compound particle | Matrix-forming component liquid dispersion | Particle concentration (wt %) | Fluorine-substituted alkyl-containing silicone concentration (wt %) | Matrix component concentration (wt %) |
| B-1 | P-1 | M-1 | 0.2 | 0.03 | 0.62 |
| B-2 | P-2 | M-2 | 0.2 | 0.15 | 0.50 |

TABLE 5-continued

Transparent Film-Forming Liquid

| Liquid | Inorganic compound particle | Matrix-forming component liquid dispersion | Particle concentration (wt %) | Fluorine-substituted alkyl-containing silicone concentration (wt %) | Matrix component concentration (wt %) |
|---|---|---|---|---|---|
| B-3 | P-3 | M-1 | 0.2 | 0.03 | 0.62 |
| B-4 | P-4 | M-1 | 0.2 | 0.03 | 0.62 |
| B-5 | P-5 | M-3 | 0.2 | 0.03 | 0.62 |
| B-6 | P-3 | M-4 | 0.25 | 0.05 | 0.80 |
| B-7 | P-6 | M-1 | 0.2 | 0.03 | 0.62 |
| B-8 | — | M-5 | — | 0.10 | 0.90 |
| B-9 | P-7 | M-6 | 0.2 | 0.00 | 0.65 |
| B-10 | P-7 | M-1 | 0.2 | 0.05 | 0.60 |
| B-11 | P-1 | M-6 | 0.2 | 0.00 | 0.65 |

Matrix component concentration includes the fluorine-substituted alkyl-containing silicone concentration.

TABLE 6

Evaluation Results of Transparent Film-Coated Substrate, Electroconductive Layer Not Employed

| | | Transparent film-coated substrate | | | | | |
|---|---|---|---|---|---|---|---|
| | | Transparent | | | Luminous | | Film strength |
| | Transparent film-forming liquid | film thickness (nm) | Refractivity | Bottom reflectivity (%) | reflection factor (%) | Haze (%) | Rubber eraser strength | Scratch strength |
| Example 1 | B-1 | 100 | 1.42 | 1.4 | 1.7 | 0.2 | A | A |
| Example 2 | B-2 | 100 | 1.40 | 1.3 | 1.4 | 0.1 | A | A |
| Example 3 | B-3 | 100 | 1.37 | 1.2 | 1.5 | 0.3 | A | A |
| Example 4 | B-4 | 100 | 1.34 | 1.1 | 1.4 | 0.2 | A | A |
| Example 5 | B-5 | 100 | 1.41 | 1.4 | 1.7 | 0.5 | A | A |
| Example 6 | B-6 | 100 | 1.37 | 1.2 | 1.5 | 0.2 | A | A |
| Comp Ex. 1 | B-7 | 100 | 1.46 | 2.0 | 2.4 | 1.2 | A | A |
| Comp Ex. 2 | B-8 | 100 | 1.44 | 1.7 | 1.9 | 0.2 | A | C |
| Comp Ex. 3 | B-9 | 100 | 1.44 | 1.9 | 2.2 | 0.5 | B | C |
| Comp Ex. 4 | B-10 | 100 | 1.45 | 1.9 | 2.2 | 0.3 | A | B |
| Comp Ex. 5 | B-11 | 100 | 1.42 | 1.5 | 1.9 | 0.3 | A | C |

Example 7

Production of Transparent Film-Coated Glass Panel

The aforementioned electroconductive film-forming liquid (CS-1) was applied to form an electroconductive film in a thickness of 20 nm on a Brown tube glass panel (14") having a surface kept at 40° C. by a spinner method under the conditions of 100 rpm and 90 seconds, and the film was dried.

Then the transparent film-forming liquid (B-1) was applied to form a transparent film in a thickness of 100 nm on the electroconductive layer by a spinner method under the conditions of 100 rpm and 90 seconds. The film was dried, and baked at 160° C. for 30 minutes to obtain a transparent film-coated glass panel.

The above transparent film-coated glass panel was tested for haze and reflectivity. The haze was measured by a haze computer (Model: 3000A, manufactured by Nippon Denshoku K.K.). The reflectivity was measured according to JIS Z8727 by a reflectometer (Model: MCPD-2000, manufactured by Ohtsuka Denshi K.K.). The minimum reflectivity in the wavelength range from 400 nm to 700 nm is defined as the bottom reflectivity. The average reflectivity in the wavelength range from 400 nm to 700 nm is defined as the luminous reflection factor which was measured according to JIS Z8727.

The surface resistance of the transparent film-coated glass panel was measured as follows. On the transparent film-coated glass panel, two soldered electrodes were formed in parallel at a distance of 5 cm by means of an ultrasonic soldering machine (Model: SUNBONDER USM-III, solder line diameter 1.6 mm, melting temperature 224° C., manufactured by Asahi Glass Co., Ltd.). Thereby, the solder electrodes were electrically connected through the transparent coating film with the electroconductive layer. The outer electrodes were cut out. The resistance between the electrodes was measured at a temperature of 23±5° C. and a relative humidity of 40% or lower in a desiccator by means of an electric tester (Model: High Tester 3244, manufactured by HIOKI Denki K.K.).

The adhesiveness was tested as follows. The surface of the transparent coating film was cut with a knife in 11 lines in the vertical direction and the lateral direction respectively to form 100 cut squares on the surface. Thereto a pressure-sensitive adhesive tape was put to adhere once. Then the adhesive tape was peeled. The adhesiveness of the coating film was evaluated on two levels from the number of the cut squares remaining unpeeled according to the evaluation standard below.

Good: 95 or more cut squares remain unpeeled.
No good: 94 or less cut squares remain unpeeled.

A display device was assembled with the transparent film-coated panel plate for evaluation of the display performance. The display performance is evaluated from the quality of the displayed image, the degree of reflection of a fluorescent lamp light (mirror reflection of the lamp) placed at a distance of 5 m apart from the displaying face, and the coloring degree according to the evaluation standard below.

AA: The reflection (mirror reflection) and the coloring are weak, and the image is sharp.

A: The reflection (mirror reflection) is weak, and coloring is observed, but the image is sharp.

B: The reflection (mirror reflection) and the coloring are remarkable, and the image is partly unsharp.

C: The reflection (mirror reflection) and the coloring are remarkable, and the image reflection is sharper than the displayed image.

The film strength was evaluated by the rubber eraser strength and the scratch strength as below.

Rubber Eraser Strength

A piece of rubber eraser (1K, produced by Lion Corp.) was set on the transparent film-coated glass plate with a load of 1±0.1 Kg applied on the rubber eraser. The rubber eraser was moved forward and backward 25 times at a stroke of about 25 mm. The formed scrapings were blown away by compressed air at each reciprocating movement. After 25 times of the reciprocating movement, the surface of the transparent film was examined visually at a distance of 45 cm apart from the surface under illumination of 1000 lx.

Evaluation Standard:

A: No scratch is observed.

B: Color of reflection of the fluorescent lamp light is changed (from violet to red).

C: No reflection of the fluorescent lamp light is observed, and scratch is observed.

D: The base plate is bared.

Scratch Strength

A standard test needle (Hardness: HRC-60, diameter 0.5 mm, produced by Rockwell Co.) was set on the transparent film with a load of 1±0.3 Kg. The needle was moved to sweep the surface at a stroke of 30-40 mm. The surface of the coating film was examined visually 45 cm apart from the surface under illumination of 1000 lx.

Evaluation Standard:

A: No scratch is observed.

B: Color of reflection of the fluorescent lamp light is changed (from violet to red).

C: No reflection of the fluorescent lamp light is observed, and scratch is observed.

D: The base plate is bared.

The water resistance and the chemical resistance were evaluated as below.

Water Resistance

The transparent film-coated base plate was immersed in boiling distilled water of 100° C. for 30 minutes. Thereafter, the surface resistance, the reflectivity, and the haze were measured in the same manner as above.

Chemical Resistance (1)

The transparent film-coated base plate was immersed in an aqueous 5% by weight hydrochloric acid solution for 10 hours. Thereafter, the surface resistance, the reflectivity, and the haze were measured in the same manner as above.

Chemical Resistance (2)

The transparent film-coated base plate was immersed in an aqueous 5% by weight hydrochloric acid solution for 200 hours. Thereafter, the surface resistance, the reflectivity, and the haze were measured in the same manner as above.

Table 7 shows the results.

Examples 8-14

Transparent Film-Coated Glass Panel

An electroconductive layer was formed from the electroconductive film-forming liquid (CS-1)—(CS-4) in a thickness as shown in Table 7 in the same manner as in Example 7. Thereon, a transparent film was formed from the aforementioned transparent-film forming liquid (B-2)-(B-6) in the same manner as in Example 7 to produce a transparent film-coated substrate.

Figure 4:
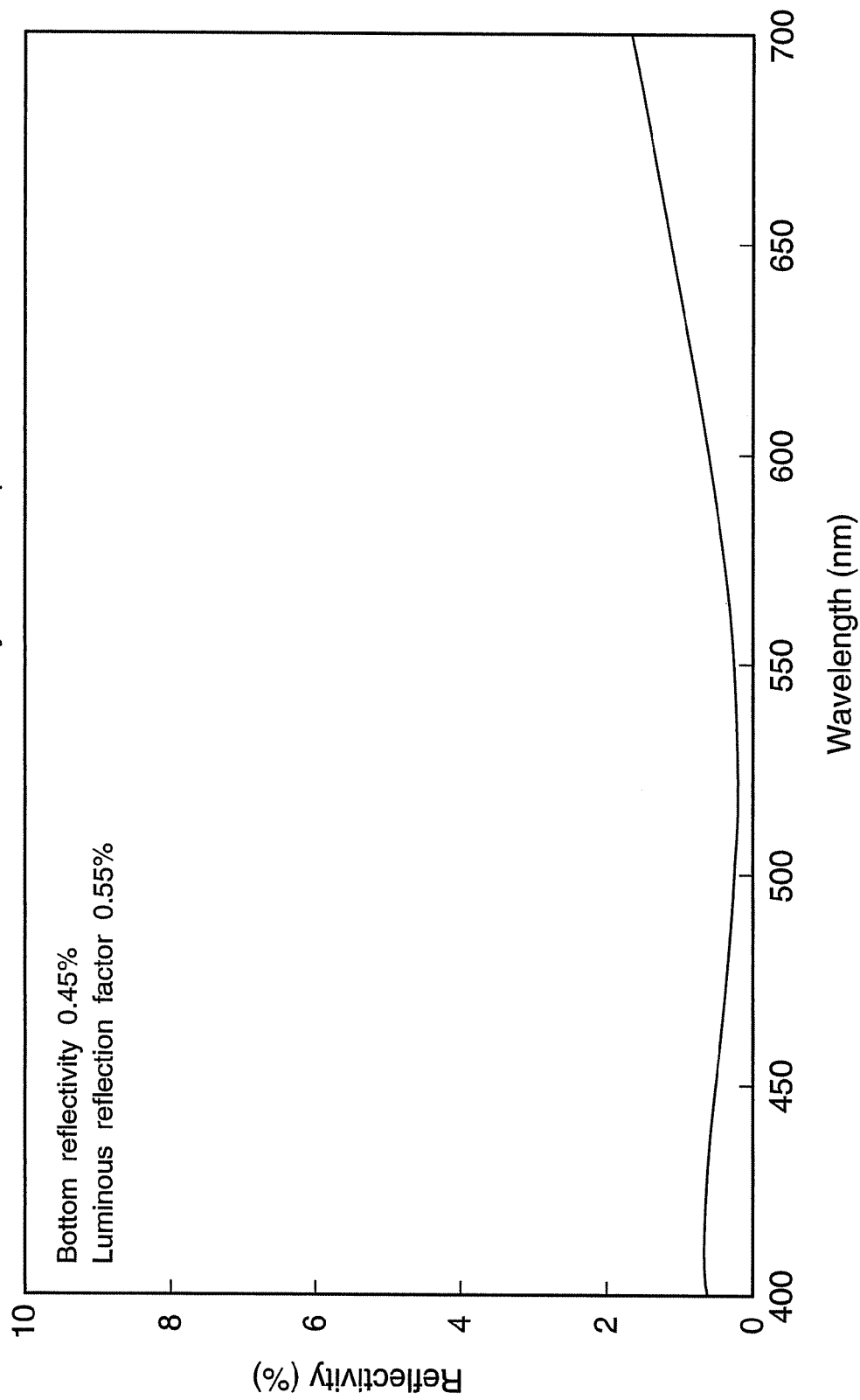
FIG. 4 is a reflectivity curve in the wavelength region 400 to 700 nm measured by Example 13.

The obtained transparent film-coated substrate was evaluated for the surface resistance, haze, reflectivity, adhesiveness, film strength, and display performance. Table 7 shows the evaluation results. The water resistance, the chemical resistance (1), and the chemical resistance (2) were also evaluated in the same manner as in Example 7. In Example 12, the chemical resistance (2) was not evaluated. Table 7 shows the results. Furthermore, FIG. 4 shows reflectivity curve in the wavelength region of 400 to 700 nm of the transparent film coated substrate of Example 13. The luminous reflection factor measured is calculated based on the datum such as FIG. 4.

Comparative Examples 6-12

Transparent Film-Coated Glass Panel

In Comparative Examples 6-9 and 12, an electroconductive layer (20 nm thick) was formed from the electroconductive film-forming liquid (CS-1) in the same manner as in Example 7. Thereon, a transparent film was formed from the aforementioned transparent-film forming liquid (B-7)-(B-11) in the same manner as in Example 7 to produce a transparent film-coated substrate.

In Comparative Example 10, an electroconductive layer (100 nm thick) was formed from the electroconductive film-forming liquid (CS-3) in the same manner as in Example 12. Thereon, a transparent film was formed from the transparent-film forming liquid (B-9) in the same manner as in Example 6 to produce a transparent film-coated substrate.

In Comparative Example 11, an electroconductive layer (20 nm thick) was formed from the electroconductive film-forming liquid (CS-4) in the same manner as in Example 13. Thereon, a transparent film was formed from the transparent-film forming liquid (B-9) in the same manner as in Example 6 to produce a transparent film-coated substrate.

The obtained transparent film-coated substrate was evaluated for the surface resistance, haze, reflectivity, adhesiveness, film strength, and display performance. Table 7 shows the evaluation results. The water resistance, the chemical resistance (1), and the chemical resistance (2) were also evaluated as in Example 7. In Comparative Example 10, the chemical resistance (2) was not evaluated. Table 7 shows the results.

TABLE 7

Properties of Transparent Film-Coated Substrate, Electroconductive Layer Employed

| | Electroconductive layer | | | Transparent film-coated substrate | | | | | | | |
|---|---|---|---|---|---|---|---|---|---|---|---|
| | Electroconductive | | | Transparent film | | | | Bottom | Luminous | | Film strength |
| | film-forming liquid | Thickness (nm) | Electroconductive particle | Transparent film-forming liquid | Thickness [nm] | Inorganic compound particle | Surface resistance Ω/□ | reflectivity (%) | reflection factor (%) | Haze (%) | Adhesiveness | Rubber eraser strength |
| Example 7 | CS-1 | 20 | Ag/Pd | B-1 | 100 | shell(1) | 1,800 | 0.05 | 0.25 | 0.05 | Good | A |
| Example 8 | CS-1 | 20 | Ag/Pd | B-2 | 100 | shell(1) | 1,800 | 0.03 | 0.20 | 0.05 | Good | A |
| Example 9 | CS-1 | 20 | Ag/Pd | B-3 | 100 | shell(1) | 1,800 | 0.01 | 0.10 | 0.05 | Good | A |
| Example 10 | CS-1 | 20 | Ag/Pd | B-4 | 100 | shell(2) | 1,800 | 0.01 | 0.08 | 0.05 | Good | A |
| Example 11 | CS-2 | 20 | Ag/Pd | B-5 | 100 | shell(1) | 1,800 | 0.06 | 0.28 | 0.05 | Good | A |
| Example 12 | CS-3 | 100 | ITO | B-6 | 100 | shell(1) | 5,000 | 0.50 | 0.65 | 0.70 | Good | A |
| Example 13 | CS-4 | 20 | ATO | B-6 | 100 | shell(1) | $6\cdot10^8$ | 0.45 | 0.55 | 0.50 | Good | A |
| Example 14 | CS-1 | 50 | Ag/Pd | B-1 | 100 | shell(1) | 800 | 0.01 | 0.25 | 0.10 | Good | A |
| Comp Ex. 6 | CS-1 | 20 | Ag/Pd | B-7 | 100 | porous matter | 1,800 | 0.85 | 1.30 | 0.30 | Good | A |
| Comp Ex. 7 | CS-1 | 20 | Ag/Pd | B-8 | 100 | porous matter | 2,000 | 0.55 | 0.95 | 0.80 | Good | A |
| Comp Ex. 8 | CS-1 | 20 | Ag/Pd | B-9 | 100 | porous matter | 1,800 | 0.60 | 1.00 | 0.80 | Good | B |
| Comp Ex. 9 | CS-1 | 20 | Ag/Pd | B-10 | 100 | porous matter | 1,800 | 0.55 | 0.95 | 0.80 | Good | B |
| Comp Ex. 10 | CS-3 | 100 | ITO | B-9 | 100 | porous matter | 5,000 | 0.60 | 0.80 | 0.80 | Good | B |
| Comp Ex. 11 | CS-4 | 20 | ATO | B-9 | 100 | porous matter | $6\cdot10^8$ | 0.55 | 0.70 | 0.70 | Good | B |
| Comp Ex. 12 | CS-1 | 20 | Ag/Pd | B-1 | 100 | porous matter | 1,800 | 0.10 | 0.35 | 0.10 | Good | A |

| | Transparent film-coated substrate | | Water resistance | | | Chemical resistance (1) | | | Chemical resistance (2) | | |
|---|---|---|---|---|---|---|---|---|---|---|---|
| | Film strength Scratch strength | Display performance | Surface resistance Ω/□ | Luminous reflection factor (%) | Haze (%) | Surface resistance Ω/□ | Luminous reflection factor (%) | Haze (%) | Surface resistance Ω/□ | Luminous reflection factor (%) | Haze (%) |
| Example 7 | B | AA | 1,800 | 0.25 | 0.30 | 1,900 | 0.26 | 0.10 | 2,100 | 0.30 | 0.30 |
| Example 8 | B | AA | 1,800 | 0.03 | 0.22 | 1,900 | 0.22 | 0.15 | 2,100 | 0.28 | 0.20 |
| Example 9 | B | AA | 1,800 | 0.12 | 0.15 | 1,900 | 0.12 | 0.10 | 2,100 | 0.15 | 0.20 |
| Example 10 | B | AA | 1,800 | 0.10 | 0.15 | 1,900 | 0.10 | 0.10 | 2,100 | 0.13 | 0.20 |
| Example 11 | B | AA | 1,800 | 0.30 | 0.15 | 1,900 | 0.30 | 0.10 | 2,100 | 0.33 | 0.20 |
| Example 12 | B | AA | 5,000 | 0.70 | 0.70 | 100,000 | 1.00 | 1.50 | — | — | — |
| Example 13 | B | AA | $6\cdot10^8$ | 0.55 | 0.65 | $6\cdot10^8$ | 0.55 | 0.68 | $7\cdot10^8$ | 0.70 | 0.70 |
| Example 14 | B | AA | 800 | 0.20 | 0.10 | 900 | 0.23 | 0.15 | 1,000 | 0.25 | 0.30 |
| Comp Ex. 6 | B | B | 1,900 | 1.80 | 0.50 | 3,500 | 2.25 | 1.00 | 10,000 | 2.50 | 1.15 |
| Comp Ex. 7 | C | B | 2,200 | 1.05 | 0.95 | 4,500 | 1.80 | 1.20 | 12,000 | 1.95 | 1.50 |
| Comp Ex. 8 | D | B | 1,900 | 1.25 | 0.95 | 3,500 | 1.85 | 1.55 | 10,000 | 1.95 | 1.80 |
| Comp Ex. 9 | C | B | 1,900 | 1.15 | 0.80 | 3,500 | 1.75 | 1.50 | 10,000 | 1.95 | 1.80 |
| Comp Ex. 10 | C | B | 6,000 | 2.80 | 2.50 | $10^7$ or more | 3.50 | 3.40 | — | — | — |
| Comp Ex. 11 | C | B | $1\cdot10^9$ | 1.00 | 1.25 | $7\cdot10^8$ | 0.90 | 1.35 | $8\cdot10^8$ | 1.05 | 1.50 |
| Comp Ex. 12 | C | AA | $1.1\times10^7$ | 2.35 | 2.10 | 2,500 | 0.55 | 0.35 | 3,500 | 0.75 | 0.55 |

ITO: tin-doped indium oxide
ATO: antimony-doped tin oxide
Shell(1): particle having a porous matter inside the silica shell layer
Shell(2): particle having a cavity inside the silica shell layer
Porous matter: porous particle (no shell layer)

What is claimed is:

1. An inorganic compound particle comprises a compacted shell and a hollow cavity and/or an inorganic porous material enclosed by the shell,
   wherein the shell of the inorganic compound particle is mainly composed of silica, and the inorganic compound particle has a refractive index lower than 1.36.

2. The inorganic compound particle according to claim 1, wherein the inorganic compound particle has an average particle diameter ranging from 5 to 300 nm.

3. The inorganic compound particle according to claim 2, wherein the shell of the inorganic compound particles has a thickness ranging from 1 to 20 nm.

4. The inorganic compound particle according to claim 1, wherein the shell of the inorganic compound particles has a thickness ranging from 1 to 20 nm.

5. The inorganic compound particle according to claim 1, wherein the inorganic compound has a refractive index of 1.31 to 1.35.

6. The inorganic compound particle according to claim 1, wherein the inorganic compound has a void ratio of higher than 20% by volume.

7. The inorganic compound particle according to claim 1, wherein the inorganic compound is prepared by (a) preparing separately or as a mixture aqueous alkali solutions of a raw material silica source and raw material non-silica inorganic compound source to form porous material precursor particles, (b) selectively removing at least partly non-silica inorganic compound containing elements other than silicon and oxygen from the porous material precursor particles to obtain a dispersion of porous material particles or a dispersion of precursor particles having a cavity insider; and then (c) adding a hydrolysable organic silicon compound or silicic acid solution to the porous material particles.

* * * * *